US008629832B2

(12) United States Patent
Tanabe

(10) Patent No.: US 8,629,832 B2
(45) Date of Patent: *Jan. 14, 2014

(54) ELECTROPHORETIC DISPLAY DEVICE, ELECTRONIC DEVICE, AND DRIVE METHOD FOR AN ELECTROPHORETIC DISPLAY PANEL

(75) Inventor: Takuya Tanabe, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 980 days.

This patent is subject to a terminal disclaimer.

(21) Appl. No.: 12/721,178

(22) Filed: Mar. 10, 2010

(65) Prior Publication Data

US 2010/0231571 A1 Sep. 16, 2010

(30) Foreign Application Priority Data

Mar. 13, 2009 (JP) ................................ 2009-061158

(51) Int. Cl.

*G09G 3/34* (2006.01)
*G02B 26/00* (2006.01)
*G09G 3/18* (2006.01)

(52) U.S. Cl.

USPC ................ 345/107; 345/34; 345/53; 359/296

(58) Field of Classification Search

USPC ........... 345/30, 55, 84, 107, 211, 214, 34, 53; 359/296

See application file for complete search history.

(56) References Cited

U.S. PATENT DOCUMENTS

| | | | | |
|---|---|---|---|---|
| 6,531,997 | B1 | 3/2003 | Gates et al. | |
| 7,012,600 | B2 | 3/2006 | Zehner et al. | |
| 7,528,822 | B2 | 5/2009 | Amundson et al. | |
| 7,602,374 | B2 * | 10/2009 | Zehner et al. | 345/107 |
| 7,868,869 | B2 | 1/2011 | Shin et al. | |
| 7,876,305 | B2 | 1/2011 | Zhou et al. | |
| 7,952,557 | B2 * | 5/2011 | Amundson et al. | 345/107 |
| 2005/0001812 | A1 | 1/2005 | Amundson et al. | |
| 2007/0057907 | A1 | 3/2007 | Ishii et al. | |
| 2007/0080926 | A1 | 4/2007 | Zhou et al. | |
| 2007/0296690 | A1 | 12/2007 | Nagasaki | |
| 2009/0046052 | A1 | 2/2009 | Kim et al. | |

FOREIGN PATENT DOCUMENTS

| | | |
|---|---|---|
| JP | 2007-079170 | 3/2007 |
| JP | 2008-003343 | 1/2008 |
| WO | 03/044765 A2 | 5/2003 |

* cited by examiner

*Primary Examiner* — Lun-Yi Lao
*Assistant Examiner* — Jarurat Suteerawongsa

(57) ABSTRACT

An electrophoretic display device has an electrophoretic display panel that has a plurality of drive electrodes, a common electrode, and a plurality of electrophoretic particles disposed between the drive electrodes and the common electrode. The device also has a drive control unit including components for setting the display color and applying pulses to update the display color to a first color, a second color, or an intermediate color between the first and second colors. The first or second color is displayed by applying a first or second pulse respectively. The first and second pulses are opposite in polarity to maintain DC balance. A method of driving such a device is also provided.

8 Claims, 17 Drawing Sheets

| | WHITE | LIGHT GRAY | DARK GRAY | BLACK |
|---|---|---|---|---|
| WHITE ⇒ | | −1 | −3 | −9 |
| LIGHT GRAY ⇒ | +7 | | −2 | −8 |
| DARK GRAY ⇒ | +8 | +1 | | −6 |
| BLACK ⇒ | +9 | +2 | +1 | |

FIG. 7

| | WHITE | LIGHT GRAY | DARK GRAY | BLACK |
|---|---|---|---|---|
| WHITE ⇒ | | −1(B) | −3(B) | −3(A)<br>−9(B) |
| LIGHT GRAY ⇒ | +7(B) | | −2(B) | −8(B) |
| DARK GRAY ⇒ | +8(B) | +1(B) | | −6(B) |
| BLACK ⇒ | +3(A)<br>+9(B) | +2(B) | +1(B) | |

FIG.13

ELECTROPHORETIC DISPLAY DEVICE, ELECTRONIC DEVICE, AND DRIVE METHOD FOR AN ELECTROPHORETIC DISPLAY PANEL

CROSS-REFERENCE TO RELATED APPLICATION(S)

Japanese Patent application No. 2009-061158 is hereby incorporated by reference in its entirety. This application is also related to U.S. application Ser. No. 12/717,346, filed on Mar. 4, 2010.

BACKGROUND

1. Field of Invention

The present invention relates to an electrophoretic display device, to an electronic device, and to a drive method for an electrophoretic display panel.

2. Description of Related Art

Electronic paper, flexible display devices, and other types of new electronic display media offering some of the characteristics of hard-copy media such as paper media have been developed. Some of the features of such electronic display media include better readability and less eye fatigue than CRT, LCD, and other display device technologies that are commonly used with modern personal computers, the ability to bend, and excellent portability.

Such electronic display media include electrophoretic display devices that use electrophoresis, a phenomenon in which an electric field is applied to cause charged particles dispersed in a fluid medium to migrate, to achieve high reflectivity and low power consumption. More particularly, by sealing a fluid suspension containing numerous electrophoretic particles in transparent microcapsules to prevent the electrophoretic particles from agglomerating or settling and improve reliability, microcapsule type electrophoretic display devices are now used in timepieces, electronic paper, advertising billboards, PDA devices, and e-book readers, for example, and are expected to find new uses in a diverse range of fields, including electronic newspapers, POP (point of purchase) advertising displays, traffic signs, advertising displays in subway and train cars, posters, tourist information panels, IC cards, and flexible display devices.

A microcapsule type electrophoretic display device uses, for example, an electrophoretic display panel that has numerous microcapsules disposed between two electrodes. Each microcapsule contains positively charged white particles and negatively charged black particles suspended in a transparent medium sealed inside the microcapsule.

This type of electrophoretic display panel can be made to display black or white by applying an electric field between the electrodes of the electrophoretic display panel, thereby causing the charged particles (electrophoretic particles) to migrate in the direction of the opposite potential. Microcapsule electrophoretic display devices that can display shades between white and black (such as light gray and dark gray) and not just black and white by precisely controlling the strength of the electric field applied between the electrodes are also known from the literature.

See, for example, Japanese Unexamined Patent Appl. Pub. JP-A-2007-79170 and Japanese Unexamined Patent Appl. Pub. JP-A-2008-3343.

A problem, however, is that when the electrophoretic display device is used for a long time, the electric field applied between the electrodes of the electrophoretic display panel becomes biased (producing a DC component), potentially resulting in electrolysis of the electrodes and eventual separation.

SUMMARY OF INVENTION

An electrophoretic display device, an electronic device, and a control method for an electrophoretic display panel according to the present invention improve reliability by assuring DC balance.

A first aspect of the invention is an electrophoretic display device having an electrophoretic display panel that has a plurality of drive electrodes, a common electrode, and a plurality of electrophoretic particles disposed between the drive electrodes and the common electrode, and can update the display color of each display unit correlated to a particular drive electrode as a result of the electrophoretic particles moving according to a voltage applied between the drive electrode and the common electrode; and a drive control unit that applies voltage between the drive electrodes and the common electrode to update the display of the electrophoretic display panel. The electrophoretic display device can display a plurality of colors including a first color and a second color in each of the display units. The drive control unit includes a display color setting means that sets for each display unit an updated display color indicating the color to be displayed after the display unit is updated, a first pulse-applying means that applies a first pulse between the common electrode and the drive electrode of at least one display unit, and a second pulse-applying means that applies a second pulse between the common electrode and the drive electrode of at least one display unit. To the display units for which the updated display color is set to the first color or the second color, the first pulse-applying means applying the first pulse to display in said display units the first color or second color that is different from the color to be displayed after updating, and the second pulse-applying means applying a second pulse that is opposite polarity to the first pulse in the same amount as the first pulse to change said display units to the set display color.

The electrophoretic display panel may be an active matrix drive panel or a segment drive panel. If an active matrix electrophoretic display panel, the pixel electrodes correspond to drive electrodes, and one pixel corresponds to one display unit. If a segment-drive electrophoretic display panel is used, the segment electrodes correspond to the drive electrodes, and one segment corresponds to one display unit.

When a segment (or pixel) of an electrophoretic display panel is updated to display the first color (including situations in which the first color is overwritten to the first color) by means of the invention, a first pulse is first applied to change the color displayed before the display is updated (that is, the currently displayed color) to the second color or to overwrite the second color, and the second pulse is then applied to change from the second color to the first color.

When a segment (or pixel) of the electrophoretic display panel is updated to display the second color (including situations in which the second color is overwritten to the second color) by means of the invention, a first pulse is first applied to change the color displayed before the display is updated (that is, the currently displayed color) to the first color or to overwrite the first color, and the second pulse is then applied to change from the first color to the second color.

A second pulse of opposite polarity to the first pulse then is applied for substantially the same amount as the first pulse to the segments (or pixels) that are updated to the first color or the second color. As a result, if the first pulse and second pulse are integrated on the time base, the result is substantially 0.

The invention can therefore assure DC balance at least in the segments (or pixels) that are updated to the first color or second color.

The invention can be applied to electrophoretic display devices that can display a first color and a second color, and can also be applied to electrophoretic display devices that can display three or more colors including the first color, the second color, and at least one intermediate color between the first color and second color.

In an electrophoretic display device according to a second aspect of the invention, the first pulse-applying means applies a second pulse of the same polarity to the display units set to the same display color by the display color setting means.

With this aspect of the invention the polarity of the first pulse is determined according to the color displayed after the display is updated regardless of the color displayed before the display is updated. Because the second pulse-applying means applies a second pulse of opposite polarity to the first pulse, the polarity of the second pulse is also determined according to the updated display color irrespective of the color displayed before the display is updated. The invention therefore does not need to determine the color displayed before the display is updated, and enables simplifying the configuration of the electrophoretic display device.

In a third aspect of the invention, the first pulse-applying means applies the same amount of first pulses to all display units that are to display the first color, and applies the same amount of first pulses to all display units that are to display the second color.

This aspect of the invention enables further simplifying the configuration of the electrophoretic display device.

An electrophoretic display device according to a fourth aspect of the invention also has a third pulse-applying means that applies a third pulse between the common electrode and the drive electrode of at least one display unit; and a fourth pulse-applying means that applies a fourth pulse between the common electrode and the drive electrode of at least one display unit. To the display units for which the updated display color is set to any intermediate color between the first color and the second color, the first pulse-applying means applies the first pulse to display in said display units either the first color or the second color, the second pulse-applying means applies a second pulse of opposite polarity to the first pulse to change said display units to the first color or the second color, the third pulse-applying means applies a third pulse of the same polarity as the second pulse, and the fourth pulse-applying means applies a fourth pulse of opposite polarity to the third pulse to update said display unit to the set display color. The sum of the applied second pulses and the applied third pulses, and the sum of the applied first pulses and the applied fourth pulses, are substantially equal.

When a segment (or pixel) of the electrophoretic display panel is updated to display an intermediate color, the first pulse is first applied to change to or overwrite the second color, the second pulse is then applied to change from the second color to the first color, the third pulse is then applied to overwrite the first color, and the fourth pulse is then applied to change to the intermediate color, or the first pulse is applied to change to or overwrite the first color, the second pulse is then applied to change from the first color to the second color, the third pulse is then applied to overwrite the second color, and the fourth pulse is last applied to change from the second color to the intermediate color.

In this aspect of the invention the first pulse and fourth pulse are the same polarity, the second pulse and the third pulse are the same polarity, the polarity of the second pulse and the third pulse is opposite the polarity of the first pulse and the fourth pulse, and the sum of the second pulses and the third pulses and the sum of the first pulses and the fourth pulses applied to the segments changed to an intermediate color are substantially equal. As a result, if the first pulses, second pulses, third pulses, and fourth pulses are integrated on the time base, the result is substantially 0. The invention can therefore assure DC balance in segments (or pixels) that are updated to an intermediate color.

In a fifth aspect of the invention, the first pulse-applying means applies a first pulse of the same polarity to all display units of which the updated display color is set to an intermediate color.

With this aspect of the invention a first pulse is applied to first change all segments (or pixels) to be updated to an intermediate color only to the first color or only to the second color. As a result, intermediate colors displayed after updating the display can be displayed without color variations because applying the fourth pulse changes all of said segments (or pixels) only from the first color to the intermediate color or from the second color to the intermediate color.

In an electrophoretic display device according to a sixth aspect of the invention, the first pulse-applying means applies a first pulse that is wider than the fourth pulse.

Another aspect of the invention is an electronic device having an electrophoretic display device described above.

Another aspect of the invention is drive method for an electrophoretic display panel that has a plurality of drive electrodes, a common electrode, and a plurality of electrophoretic particles disposed between the drive electrodes and the common electrode, and can update the display color of each display unit correlated to a particular drive electrode as a result of the electrophoretic particles moving according to a voltage applied between the drive electrode and the common electrode. The drive method has a display color setting step of setting an updated display color, which indicates the color to be displayed after the display unit is updated, to one of a plurality of colors including a first color and a second color for each display unit; a first pulse-applying step of applying a first pulse between the common electrode and the drive electrode of at least one display unit; and a second pulse-applying step of applying a second pulse between the common electrode and the drive electrode of at least one display unit. To the display units for which the updated display color is set to the first color or the second color, the first pulse-applying step applies the first pulse to display in said display units the first color or second color that is different from the color to be displayed after updating, and the second pulse-applying step applies a second pulse that is opposite polarity to the first pulse in the same amount as the first pulse to change said display units to the set display color.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 shows an example of a drive pulse table in a preferred embodiment of the invention.

FIG. 13 shows an example of a drive pulse table in a fourth variation of a preferred embodiment of the invention.

DESCRIPTION OF THE PREFERRED EMBODIMENTS

Preferred embodiments of the present invention are described below with reference to the accompanying figures. It will be obvious to one with ordinary skill in the related art that the embodiments described below do not unduly limit the content of the invention described in the accompanying claims, and all components and parts of the following embodiments are not essential elements of the invention.

Figure 1A:
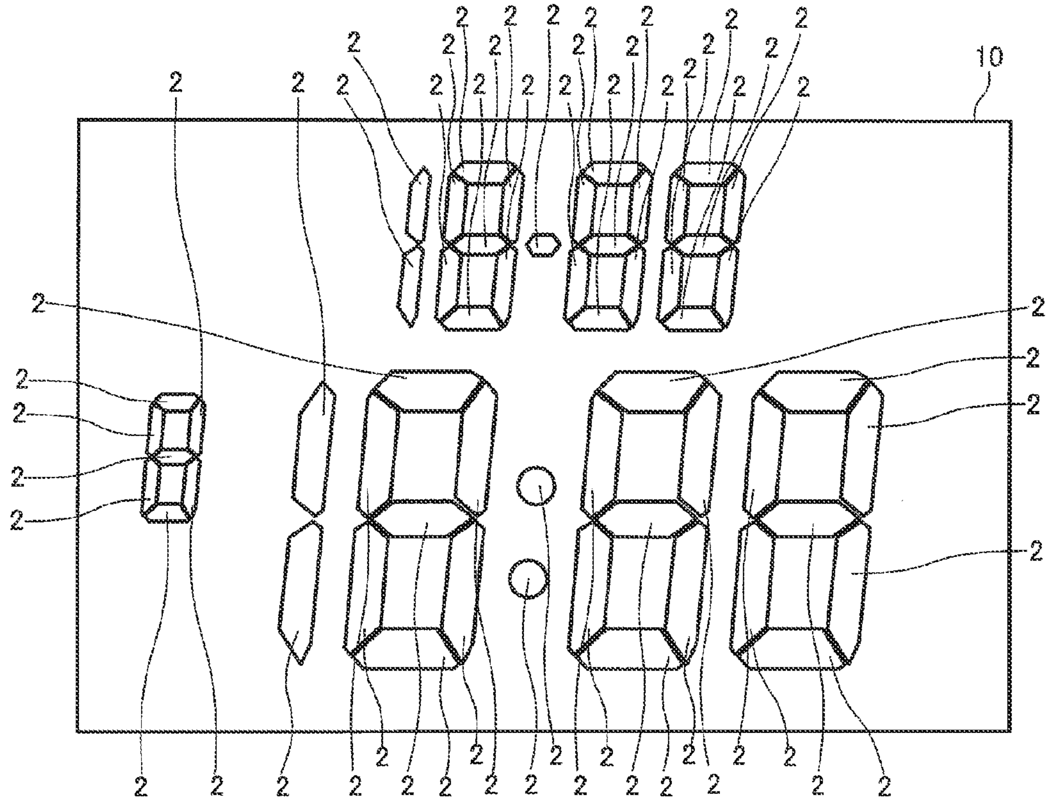
FIG. 1A is a schematic plan view of an electrophoretic display panel according to a preferred embodiment of the invention.

1. Electrophoretic Display Device and Drive Method for an Electrophoretic Display Panel Electrophoretic Display Panel Configuration FIG. 1A is a schematic plan view of an electrophoretic display panel according to a preferred embodiment of the invention. The electrophoretic display panel 10 according to this embodiment of the invention is, for example, a display panel for displaying time information by means of plural segments 2 that can be driven to display the time. The segments 2 are configured so that each segment 2 can display a plurality of colors.

Figure 1B:
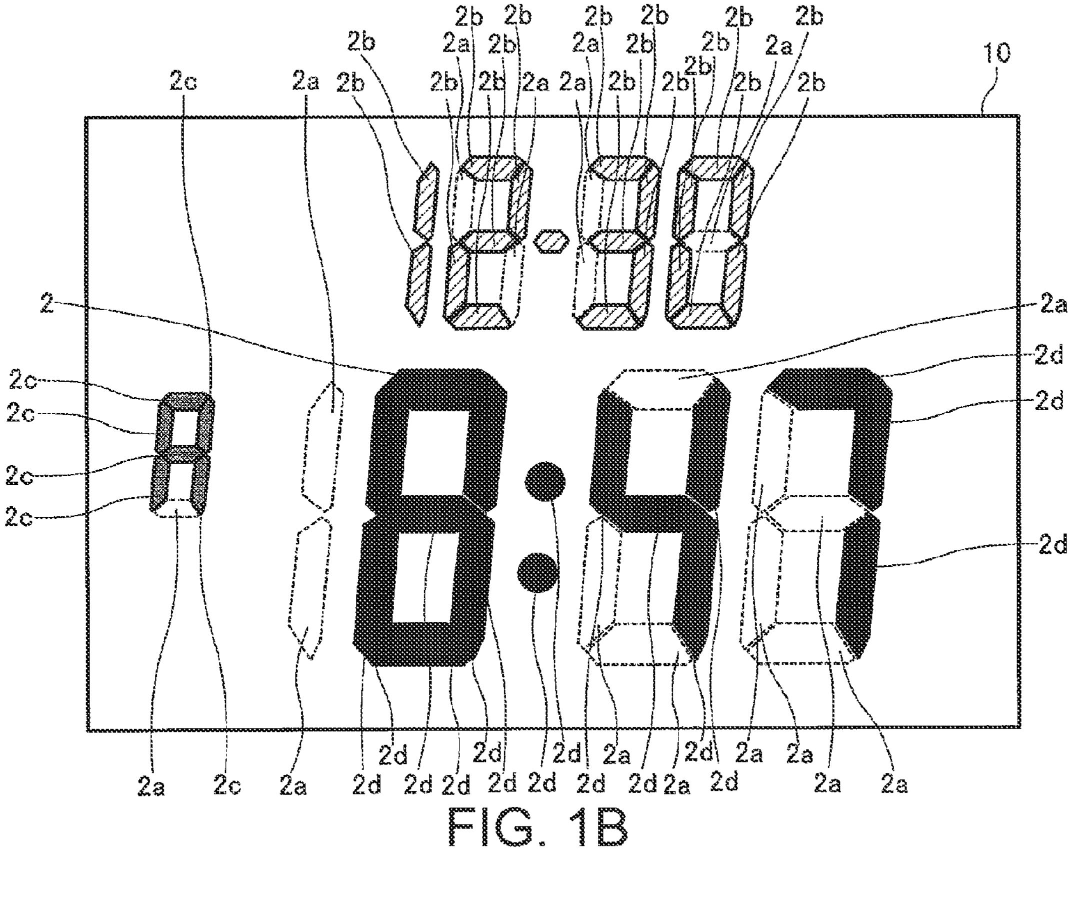
FIG. 1B shows an example of a segment display.

For example, when "December 30, 8:47 a.m." is displayed on the electrophoretic display panel 10, the segments 2*a*, 2*b*, 2*c*, and 2*d* are driven to display white, light gray, dark gray, and black, respectively, as shown in FIG. 1B.

Figure 2:
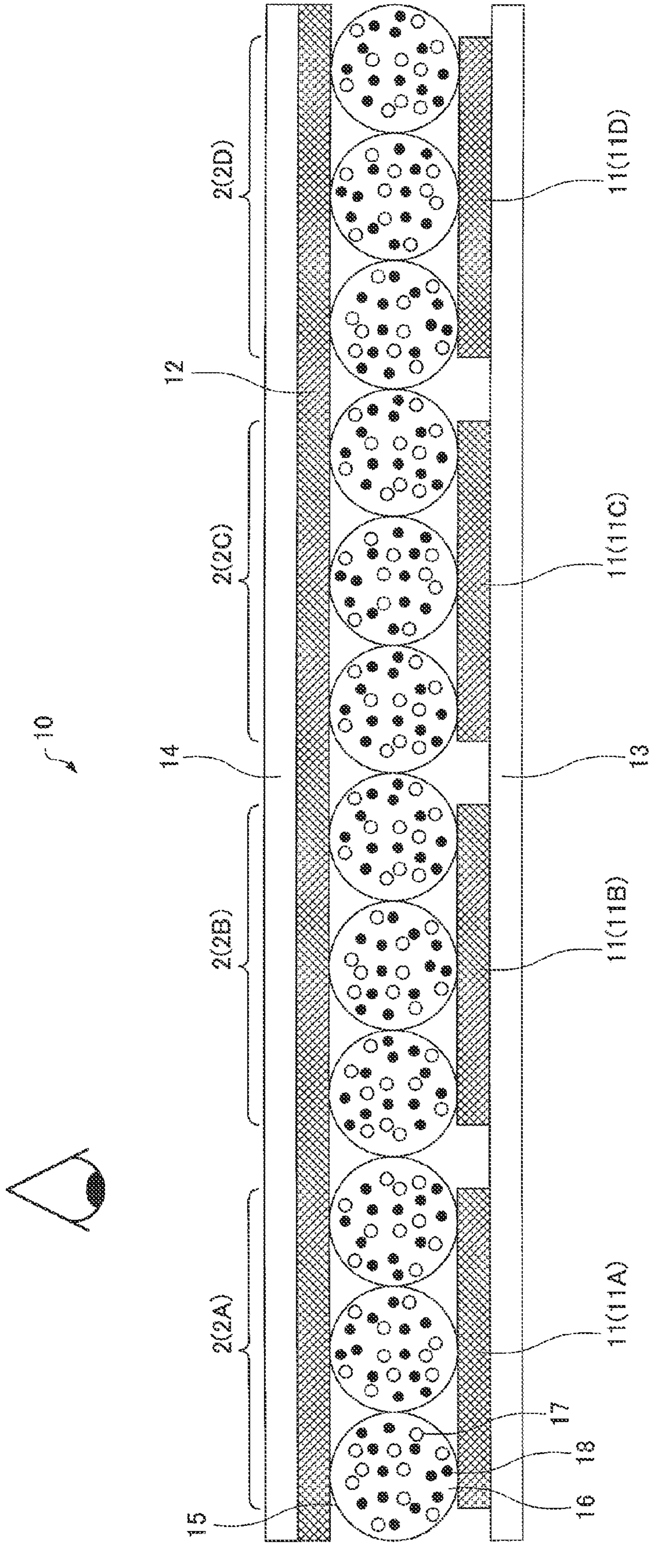
FIG. 2 is a schematic section view of the electrophoretic display panel in a preferred embodiment of the invention.

FIG. 2 is a schematic section view of an electrophoretic display panel according to this embodiment of the invention. As shown in FIG. 2, the electrophoretic display panel 10 has a base substrate 13 and an opposing substrate 14 that is made of glass, plastic, or other transparent material disposed opposite the base substrate 13. A plurality of segment electrodes (drive electrodes) 11 (11A to 11D) are disposed on the base substrate 13 side, and a common electrode 12 made from a transparent conductive material, such as indium tin oxide (ITO) having high light transmittance and low electrical resistance, is disposed on the opposing substrate 14 side. Transparent microcapsules 15 are disposed between the segment electrodes 11 (11A to 11D) and the common electrode 12.

A colorless, transparent solvent 16, a plurality of positively charged white particles 17, and a plurality of negatively charged black particles 18 are sealed in the microcapsules 15. The microcapsules 15 are made of gelatin and gum arabic, or urea-formaldehyde resin, for example, and an aliphatic hydrocarbon, dodecylbenzene, or other nonaqueous solvent is used for the dielectric fluid. A material with high reflectivity, such as titania ($TiO_2$), magnesium oxide (MgO), zinc oxide (ZnO), or alumina ($Al_2O_3$), for example, may be used for the white particles 17. A material with high absorbance, such as carbon black, can be used for the black particles 18.

When a field flowing from the segment electrode 11 to the common electrode 12 (positive direction) is produced, the white particles 17 migrate toward the common electrode 12, and the black particles 18 migrate toward the segment electrode 11 side. Conversely, when a field is produced flowing from the common electrode 12 to the segment electrode 11 (negative direction) side, the white particles 17 migrate to the segment electrode 11 side and the black particles 18 migrate to the common electrode 12 side. There is substantially no movement of the white particles 17 or black particles 18 when a field is not produced between the segment electrode 11 and the common electrode 12.

Figure 3:
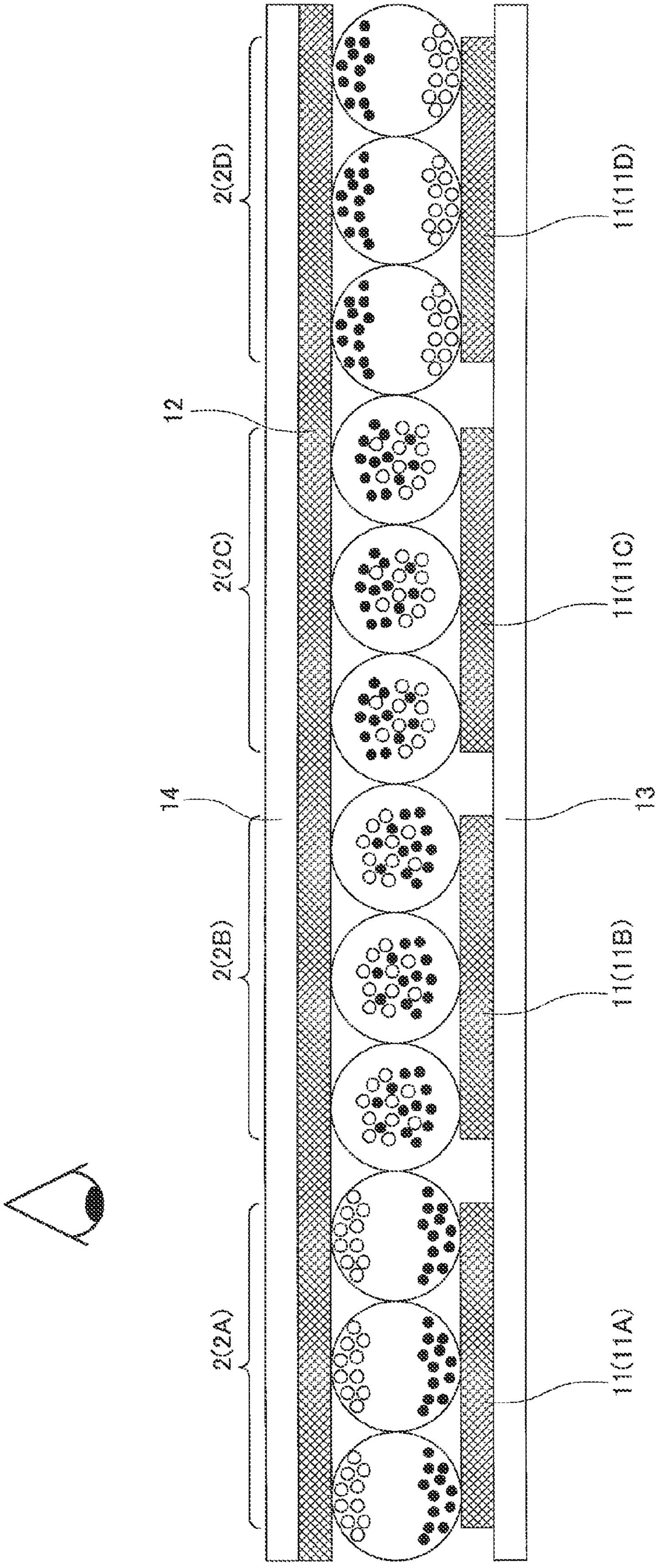
FIG. 3 describes the display color of each display segment.

More specifically, the positions of the white particles 17 and black particles 18 can be controlled by controlling the orientation and strength of the field produced between the segment electrode 11 and common electrode 12, and controlling how long the field is applied, and the color that is seen from the outside of each segment 2 varies according to the positions of the white particles 17 and the black particles 18. For example, if the white particles 17 and black particles 18 are positioned as shown in FIG. 3, the colors of the segments 2A, 2B, 2C, 2D corresponding to segment electrodes 11A, 11B, 11C, 11D, respectively, will appear to be white, light gray, dark gray, and black.

It should be noted that the white particles 17 are positively charged and the black particles 18 are negatively charged in this embodiment of the invention, but the white particles 17 may be negatively charged and the black particles 18 positively charged.

It should be further noted that the microcapsules 15 in this embodiment of the invention are two-particle microcapsules having two types of electrophoretic particles, that is, black and white electrophoretic particles, sealed in a colorless, transparent solvent 16, but the solvent may be a colored transparent solvent, and two types of electrophoretic particles other than black and white may be used. Single-particle microcapsules having white electrophoretic particles (charged negatively or positively) in a black solvent, for example, may also be used. Note, further, that when the electrophoretic display panel is to be thin, two-particle microcapsules are preferably used because of the ability to prevent a drop in contrast.

Configuration of the Electrophoretic Display Device

Figure 4:
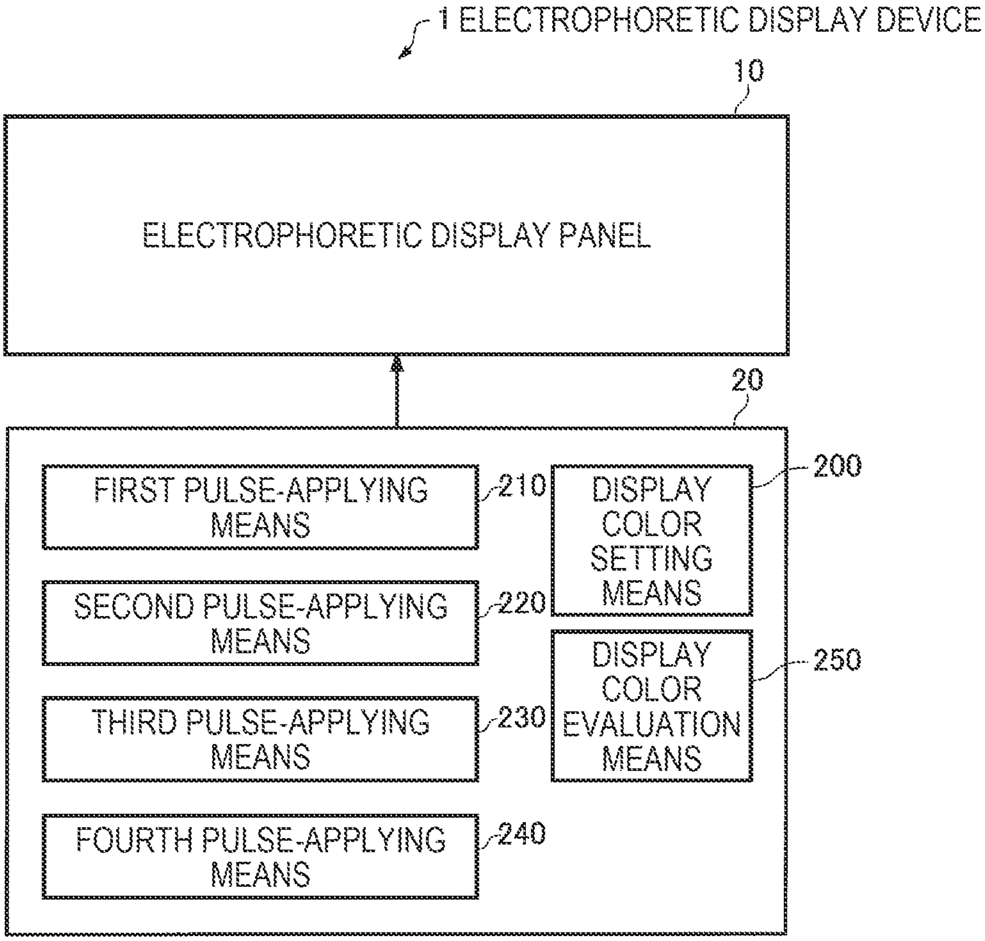
FIG. 4 is a block diagram of the configuration of an electrophoretic display device according to a preferred embodiment of the invention.

FIG. 4 describes the configuration of an electrophoretic display device according to this embodiment of the invention.

The electrophoretic display device 1 has an electrophoretic display panel 10 and a drive control unit 20 that drives the display panel 10, and is configured so that white, black, and at least one intermediate color between white and black can be displayed in each segment 2 of the electrophoretic display panel 10. Note that the electrophoretic display device according to this embodiment of the invention can display light gray and dark gray as intermediate colors, and can thus display the four colors white, black, light gray, and dark gray, for example.

The electrophoretic display panel 10 is configured as shown in FIG. 1A and FIG. 2, and further description thereof is omitted.

The drive control unit 20 includes a display color setting means 200, a first pulse-applying means 210, a second pulse-applying means 220, a third pulse-applying means 230, a fourth pulse-applying means 240, and a display color evaluation means 250.

The display color setting means 200 has an image signal processing circuit and a timing generator, for example, generates display data (the data to be displayed after the display is updated) for displaying images and text on the electrophoretic display panel 10, and sets the color to be displayed in each segment 2 after updating the display (referred to herein as the "updated display color") to white, light gray, dark gray, or black. For example, the display of the electrophoretic display panel 10 must be instantly updated every minute or when the time changes from 11:59 a.m. to 12:00 noon, for example, and the display color setting means 200 sets the display color of each segment 2 to white, light gray, dark gray, or black according to the time that is to be displayed after the display is updated.

The display color evaluation means 250 determines the color currently displayed by each segment 2, that is, whether the color displayed before the display is updated is white, light gray, dark gray, or black. For example, if the electrophoretic display panel 10 is displaying "December 30, 8:47 a.m.", information denoting the display color of each segment 2 as shown in FIG. 1B is stored in a storage unit not shown, and the display color evaluation means 250 reads the current display color of each segment 2 from the storage unit and determines whether each segment 2 is displaying white, light gray, dark gray, or black. When the display color of each segment 2 is updated, the current display color stored in the storage unit is overwritten by the color displayed after the segments are updated.

The first pulse-applying means 210, second pulse-applying means 220, third pulse-applying means 230, and fourth pulse-applying means 240 execute a process for applying drive pulses in this order between the segment electrodes 11 and the common electrode 12 of the electrophoretic display panel 10, and changing each segment 2 of the electrophoretic display panel 10 to the display color set by the display color setting means 200. Note that the pulses applied by the first pulse-applying means 210, second pulse-applying means 220, third pulse-applying means 230, and fourth pulse-applying means 240 are below respectively referred to as the first pulse, second pulse, third pulse, and fourth pulse.

Figure 5:
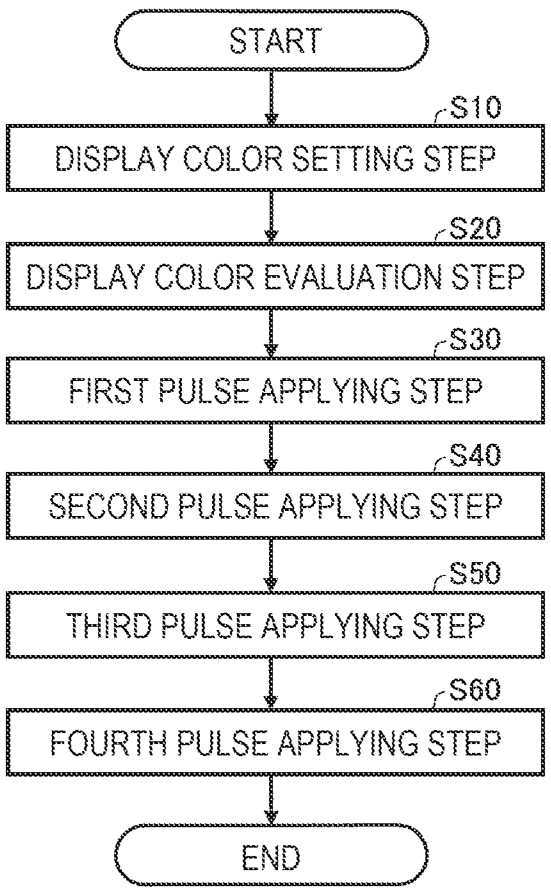
FIG. 5 is a flow chart describing the drive method (the procedure whereby the drive control unit in a preferred embodiment of the invention drives the electrophoretic display panel) of an electrophoretic display panel according to the present invention.

FIG. 5 is a flow chart describing the drive method (the procedure whereby the drive control unit in this embodiment of the invention drives the electrophoretic display panel) of an electrophoretic display panel according to this embodiment of the invention.

In this embodiment of the invention the drive control unit 20 sequentially executes a display color setting step (S10), display color evaluation step (S20), first pulse applying step (S30), second pulse applying step (S40), third pulse applying step (S50), and fourth pulse applying step (S60).

In the display color setting step (S10), the display color setting means 200 sets the updated display color for each segment to white, light gray, dark gray, or black.

In the display color evaluation step (S20), the display color evaluation means 250 determines whether the current display color (that is, the color displayed before the segments are updated) of each segment 2 is white, light gray, dark gray, or black.

Next, in the first pulse applying step (S30), the first pulse-applying means 210 applies the first pulse between the common electrode 12 and the segment electrode 11 corresponding to each segment 2 for which the updated display color is set to "white" (regardless of whether the current display color (the color displayed before the segments are updated) is white, light gray, dark gray, or black) so that those segments 2 are made to display black, and applies the first pulse between the common electrode 12 and the segment electrode 11 corresponding to each segment 2 for which the updated display color is set to "black" (regardless of whether the current display color is white, light gray, dark gray, or black) so that those segments 2 are made to display white.

The first pulse-applying means 210 also applies the first pulse between the common electrode 12 and the segment electrode 11 corresponding to each segment 2 for which the updated display color is set to "light gray" or "dark gray" (regardless of whether the current display color is white, light gray, dark gray, or black) so that those segments 2 are made to display white or black.

In the second pulse applying step (S40), the second pulse-applying means 220 applies a second pulse of the opposite polarity and substantially the same amount as the first pulse between the common electrode 12 and the segment electrode 11 corresponding to each segment 2 for which the updated display color is set to white or black (regardless of whether the current display color is white, light gray, dark gray, or black) to change those segments 2 to white or black.

The effect of the first pulse applying step (S30) and the second pulse applying step (S40) is that segments 2 for which the updated display color is set to white or black are updated to white or black while maintaining a DC balance.

The second pulse-applying means 220 also applies a second pulse of opposite polarity to the first pulse between the common electrode 12 and the segment electrodes 11 corresponding to the segments 2 for which the updated display color is set to light gray or dark gray to change those segments 2 to white or black.

Next, in the third pulse applying step (S50), the third pulse-applying means 230 applies a third pulse of the same polarity as the second pulse between the common electrode 12 and the segment electrodes 11 corresponding to the segments 2 for which the updated display color is set to light gray or dark gray. As a result, white or black is overwritten to each of these segments 2.

Next, in the fourth pulse applying step (S60), the fourth pulse-applying means 240 applies a fourth pulse of opposite polarity to the third pulse between the common electrode 12 and the segment electrodes 11 corresponding to the segments 2 for which the updated display color is set to light gray or dark gray, thereby updating those segments 2 to light gray or dark gray. The process then ends.

A first pulse, second pulse, third pulse, and fourth pulse are applied to the segments 2 for which the updated display color is set to light gray or dark gray in the foregoing process so that the sum of the applied second pulses and third pulses is substantially equal to the sum of the applied first pulses and fourth pulses. As a result, a DC balance can also be maintained in the segments 2 for which the updated display color is set to light gray or dark gray.

More specifically, this embodiment of the invention can maintain a DC balance in all of the segments 2.

Note, further, that all or part of the drive control unit 20 can be rendered using semiconductor integrated circuit devices.

The drive control unit 20 may also be rendered to control operations described above and below using dedicated circuits. For example, a CPU (central processing unit) may be caused to function like a computer by executing a control program stored in a storage unit not shown to control these processes. Yet more specifically, the drive control unit 20 can be configured to function as the display color setting means 200, the first pulse-applying means 210, the second pulse-applying means 220, the third pulse-applying means 230, the fourth pulse-applying means 240, and the display color evaluation means 250 by executing a control program.

Figure 6:
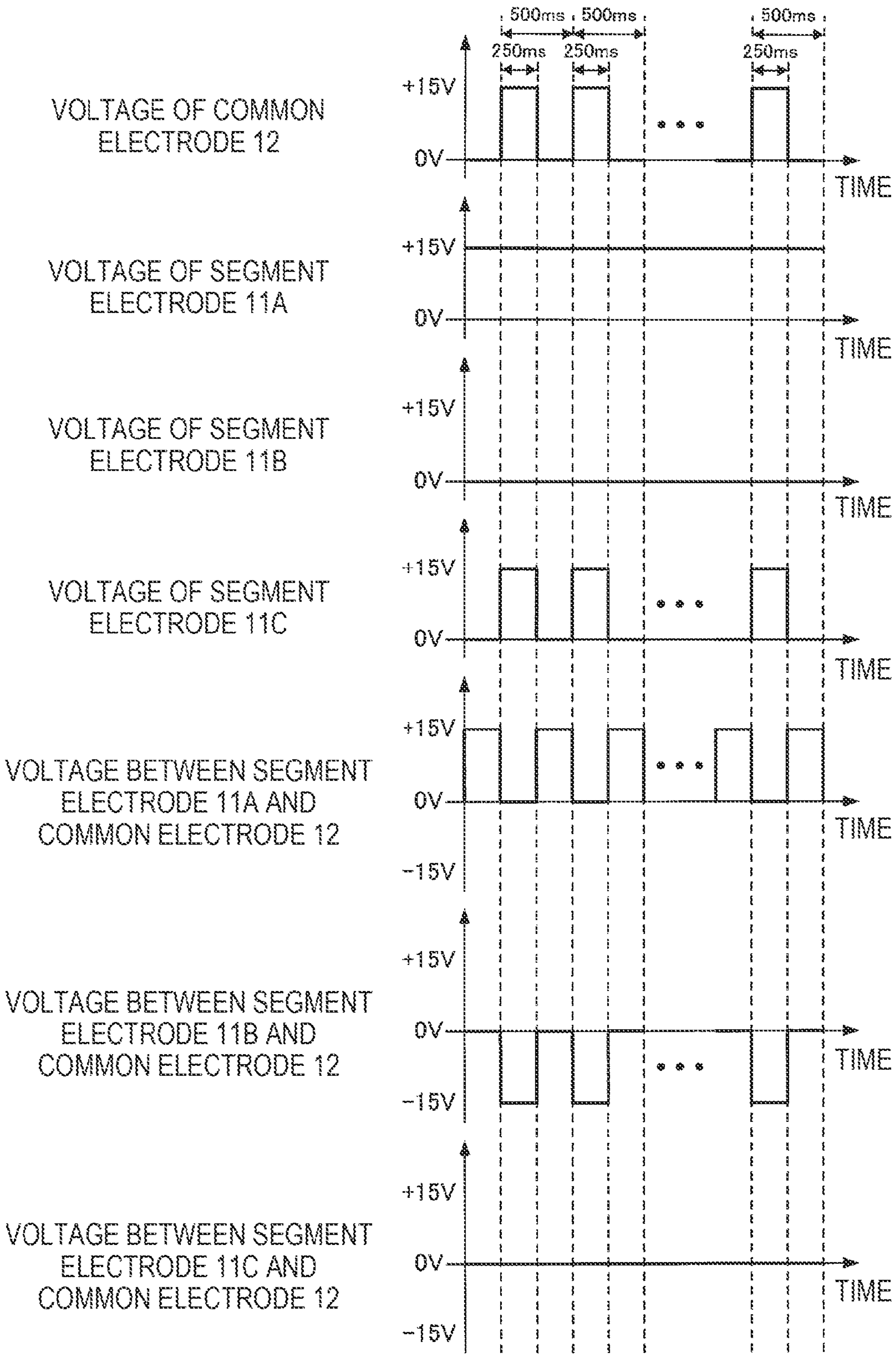
FIG. 6 describes an example of the drive pulse.

FIG. 6 describes an example of the drive pulses applied by the first pulse-applying means 210, the second pulse-applying means 220, the third pulse-applying means 230, and the fourth pulse-applying means 240.

FIG. 6 shows an example in which a +15 V drive pulse is applied between the common electrode and segment electrode 11A, a −15 V drive pulse is applied between the common electrode and segment electrode 11B, and a drive pulse is not applied between the common electrode and segment electrode 11C.

As shown in FIG. 6, +15 V pulses with a 250 ms pulse width are applied repeatedly at a 500 ms period to the common electrode 12.

A +15 V pulse is applied to the segment electrode 11A. As a result, a +15 V drive pulse with a 250 ms pulse width is repeatedly applied at a 500 ms period between the common electrode 12 and the segment electrode 11A.

A +0 V (ground potential) pulse is applied to the segment electrode 11B. As a result, a −15 V drive pulse with a 250 ms pulse width is repeatedly applied at a 500 ms period between the common electrode 12 and the segment electrode 11B.

A pulse identical to the pulse applied to the common electrode 12 is applied to segment electrode 11C. As a result, 0 V is applied between the common electrode 12 and segment electrode 11C (that is, a drive pulse is not applied).

This embodiment of the invention thus applies a drive pulse between the segment electrodes 11 and common electrode 12 by applying a pulse of a constant period to the common electrode 12 while also applying a constant voltage to the segment electrode 11. With this drive method (also called variable common electrode drive), the drive pulses of +15 V and −15 V applied between the segment electrodes 11 and the common electrode 12 can be generated from two power sources (+15 V and 0 V).

By applying a drive pulse of +15 V or −15 V between the segment electrodes 11 and the common electrode 12, this embodiment of the invention can control the direction of the electric field and maintain a constant field strength, and can control how long the electric field is produced by changing the number of pulses applied. As a result, the positions of the white particles 17 and black particles 18 can be controlled to display the desired color in each segment 2.

More specific examples are described next.

Embodiments

FIG. 7 shows an example of a drive pulse table that defines the number of drive pulses and the polarity of the drive pulses that must be applied when changing the display color of each segment 2 in a preferred embodiment of the invention.

As shown in FIG. 7, the electrophoretic display panel 10 used in this embodiment of the invention can change a segment 2 that is displaying white to light gray by applying one −15 V pulse as described in FIG. 6, to dark gray by applying three −15 V pulses, and to black by applying nine −15 V pulses.

Similarly, a segment 2 that displays light gray can be changed to white by applying seven +15 V pulses described in FIG. 6, to dark gray by applying two −15 V pulses, and to black by applying eight −15 V pulses.

In addition, a segment 2 that displays dark gray can be changed to white by applying eight +15 V pulses, to light gray by applying one +15 V pulse, and to black by applying six −15 V pulses.

In addition, a segment 2 that displays black can be changed to white by applying nine +15 V pulses, to light gray by applying two +15 V pulses, and to dark gray by applying one +15 V pulse.

Note that even if a +15 V pulse is applied to a segment 2 that displays white, the segment 2 will continue displaying white because there is substantially no change in the positions of the white particles 17 and black particles 18. Likewise, if a −15 V pulse is applied to a segment 2 that displays black, the segment 2 will continue displaying black.

Figure 8:
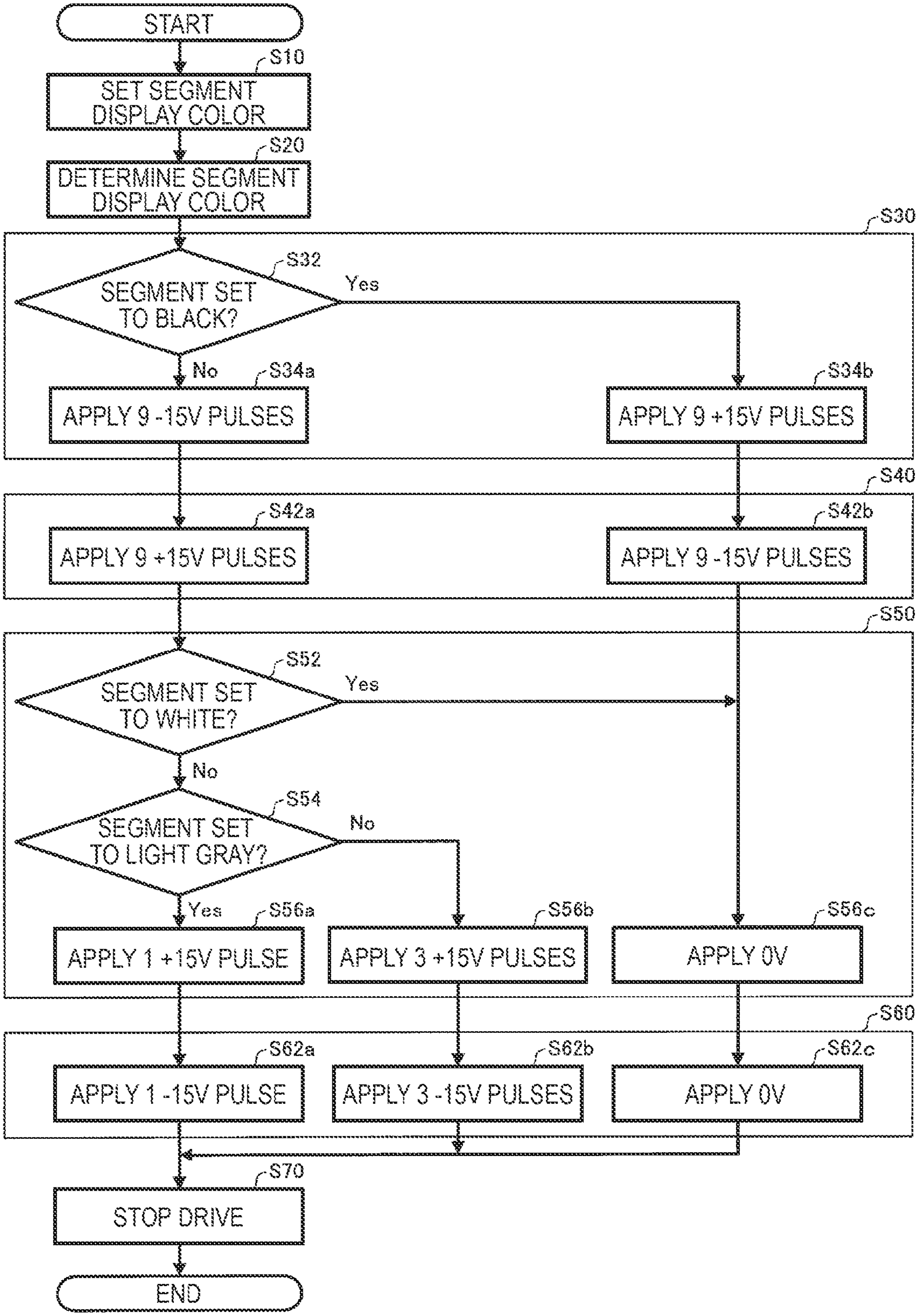
FIG. 8 is a flow chart of the drive process for an electrophoretic display panel according to the present invention.

FIG. 8 is a flow chart describing the drive process of the electrophoretic display panel 10 according to this embodiment of the invention.

As shown in FIG. 8, the color to be displayed after the display is updated (the updated display color) is first set (step S10), and the display color before the display is updated (the current display color) is determined, for each segment 2 (step S20).

Next, nine −15 V pulses (first pulses) are applied (step S34*a*) to each segment 2 for which the updated display color is set to white, light gray, or dark gray (step S32 returns No). As will be known from the drive pulse table in FIG. 7, any segment 2 that is displaying white, light gray, dark gray, or black will display black if nine −15 V pulses are applied. More specifically, step S34*a* will result in any segment 2 for which the updated display color is set to white, light gray, or dark gray changing to black.

At the same time, nine +15 V pulses (first pulses) are applied (step S34*b*) to the segments 2 for which the updated display color is set to black (step S32 returns Yes). As will be known from the drive pulse table in FIG. 7, any segment 2 that is displaying white, light gray, dark gray, or black will display white if nine +15 V pulses are applied. More specifically, step S34*b* will result in any segment 2 for which the updated display color is set to black becoming white.

Note that steps S32, S34*a*, and S34*b* correspond to the first pulse applying step (S30) in FIG. 5.

Next, nine +15 V pulses (second pulses) are applied (step S42*a*) to each segment 2 for which the updated display color is set to white, light gray, or dark gray (step S32 returns No). Note that while the segments 2 for which the updated display color is set to white, light gray, or dark gray change to black as a result of step S34*a*, these segments 2 turn white as a result of step S42*a*.

At the same time, nine −15 V pulses (second pulses) are applied (step S42*b*) to each segment 2 for which the updated display color is set to black (step S32 returns Yes). Note that while the segments 2 for which the updated display color is set to black change to white as a result of step S34*b*, these segments 2 turn black as a result of step S42*b*.

Note that steps S42*a* and S42*b* correspond to the second pulse applying step (S40) in FIG. 5.

Next, one +15 V (third pulse) is applied (step S56*a*) to the segments 2 for which the updated display color is set to light gray (step S52 returns No, and step S54 returns Yes). Note that the segments 2 for which the updated display color is set to light gray turn white as a result of step S42*a*, and are overwritten with white as a result of step S56*a*.

At the same time, three +15 V pulses (third pulses) are applied (step S56*b*) to the segments 2 for which the updated display color is set to dark gray (step S52 returns No, and step S54 returns No). Note that the segments 2 for which the updated display color is set to dark gray turn white as a result of step S42*a*, and are overwritten with white as a result of step S56*b*.

At the same time, 0 V is applied (step S56*c*) to the segments 2 for which the updated display color is set to white or black (step S32 returns Yes, or step S52 returns Yes). Because the segments 2 for which the updated display color is set to white are already driven to white by step S42*a*, there is no need to apply the third pulses, and 0 V is therefore applied in step S56*c*. Likewise, the segments 2 for which the updated display color is set to black are already driven to black in step S42*b*, and 0 V is therefore applied in step S56*c*.

Note that steps S52, S54, S56*a*, S56*b*, and S56*c* correspond to the third pulse applying step (S50) in FIG. 5.

Next, one −15 V (fourth pulse) is applied (step S62*a*) to the segments 2 for which the updated display color is set to light gray (step S52 returns No, and step S54 returns Yes). Note that the segments 2 for which the updated display color is set to light gray turn white as a result of step S56*a*. Furthermore, because a segment 2 that displays white turns light gray when one −15 V pulse is applied thereto as shown in the drive pulse table in FIG. 7, step S62*a* results in the segments 2 for which the updated display color is set to light gray turning light gray.

At the same time, three −15 V pulses (fourth pulses) are applied (step S62*b*) to the segments 2 for which the updated display color is set to dark gray (step S52 returns No, and step S54 returns No). Note that the segments 2 for which the updated display color is set to dark gray turn white as a result of step S56*b*. Furthermore, because a segment 2 that displays white turns dark gray when three −15 V pulses are applied thereto as shown in the drive pulse table in FIG. 7, step S62*b* results in the segments 2 for which the updated display color is set to dark gray turning dark gray.

At the same time, 0 V is applied (step S62*c*) to the segments 2 for which the updated display color is set to white or black (step S32 returns Yes, or step S52 returns Yes). As described above, segments 2 for which the updated display color is set to white or black are already set to white or black, there is no need to apply the fourth pulse, and 0 V is therefore applied in step S62*c*.

Note that steps S62*a*, S62*b*, and S62*c* correspond to the fourth pulse applying step (S60) in FIG. 5.

Driving the electrophoretic display panel then stops (S70), and the display update process ends.

Figure 9:
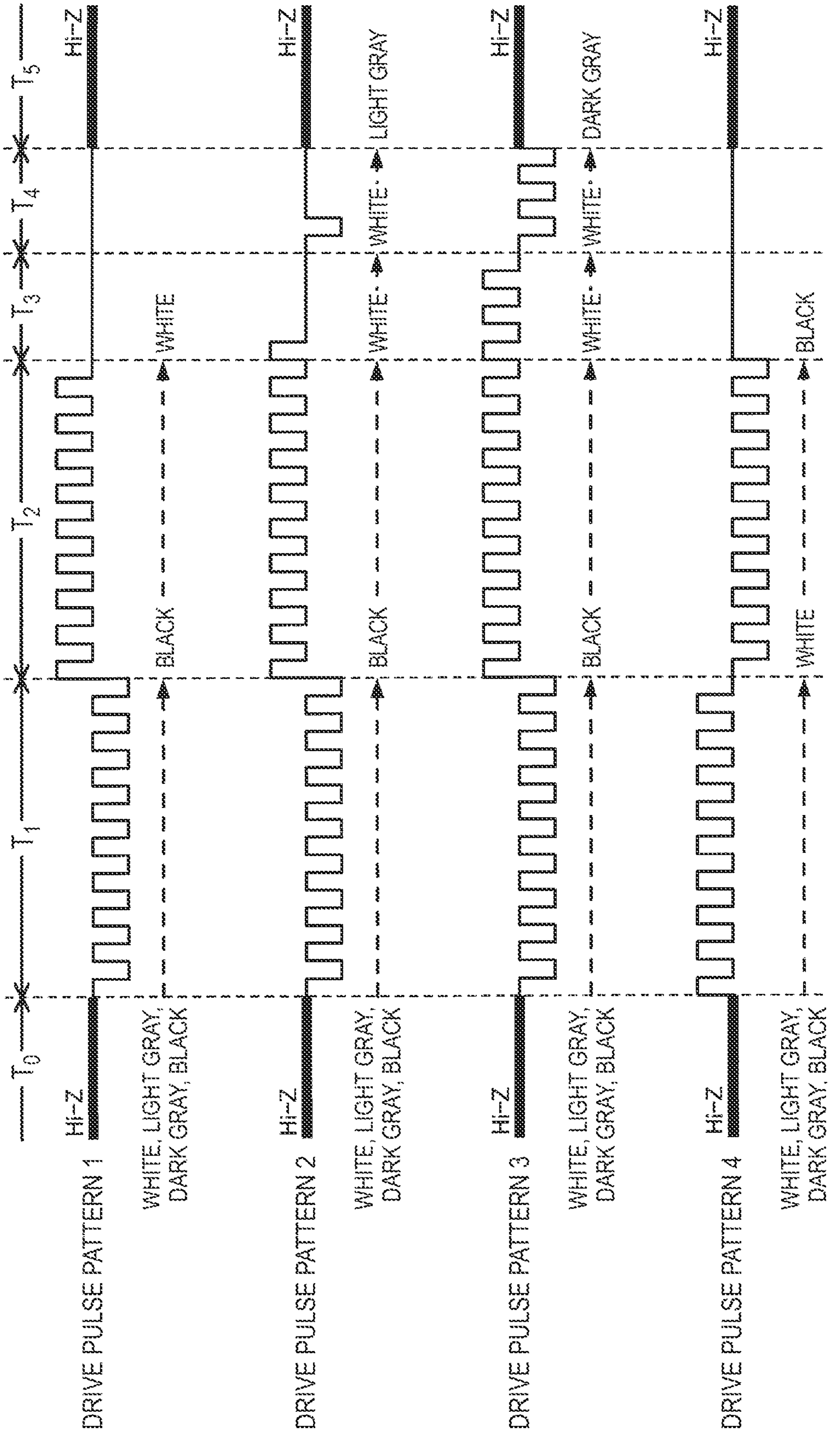
FIG. 9 shows an example of the drive pulse pattern in a preferred embodiment of the invention.

FIG. 9 shows the patterns of drive pulses applied to the segments 2 in the flow chart shown in FIG. 8. The periods $T_1$, $T_2$, $T_3$, and $T_4$ in FIG. 9 are the periods respectively corresponding to the first pulse applying step (S30), the second pulse applying step (S40), the third pulse applying step (S50), and the fourth pulse applying step (S60). Note that in order to reduce current consumption in the period $T_0$ before the first pulse applying step (S30) starts and in the period $T_5$ after driving ends (step S70), all segment electrodes 11 and the common electrode 12 are set to a high impedance state (voltage is not applied).

In FIG. 9 the drive pulse patterns 1 to 4 show the patterns of the drive pulses applied to the segments 2 for which the updated display color is set to white, light gray, dark gray, and black (note that the color displayed before the display is updated may by any color white, light gray, dark gray, or black).

In drive pulse patterns 1, 2, and 3, nine −15 V pulses (first pulse) are applied in period $T_1$, and nine +15 V pulses (second pulse) are applied in period $T_2$.

Because 0 V is also applied in period $T_3$ and period $T_4$ in drive pulse pattern 1, a DC balance is assured.

With drive pulse pattern 2, one +15 V pulse (third pulse) is also applied in period $T_3$ and one −15 V pulse (fourth pulse) is applied in period $T_4$, and DC balance is thereby assured.

With drive pulse pattern 3, three +15 V pulses (third pulse) are also applied in period $T_3$ and three −15 V pulses (fourth pulse) are applied in period $T_4$, and DC balance is thereby assured.

With drive pulse pattern 4, nine +15 V pulses (first pulse) are applied in period $T_1$ and nine −15 V pulses (second pulse) are applied in period $T_2$, and DC balance is thereby assured.

This embodiment of the invention can thus change all segments 2 to the set display color while maintaining a DC balance.

In addition, this embodiment of the invention can simplify the configuration of the electrophoretic display device 1 because only four drive pulse patterns corresponding to the set display colors (white, light gray, dark gray, or black) need to be generated.

This embodiment of the invention changes the segments 2 for which the updated display color is set to light gray or dark gray to black in the first pulse applying step (S30), changes the segments 2 from black to white in the second pulse applying step (S40), and changes them from white to light gray or dark gray in the fourth pulse applying step (S60).

For example, there may be a slight difference in the light gray color that is displayed when a segment 2 is changed from white to light gray and when the segment 2 is changed from black to light gray. This embodiment of the invention can prevent variations in the color displayed after the display is updated, however, because all segments 2 for which the updated display color is set to light gray or dark gray are changed from white to light gray or dark gray in the fourth pulse applying step (S60).

In addition, because the drive pulse pattern can be selected according to the color to be displayed after the display is updated regardless of the color displayed before the display is updated, step S20 (the display color evaluation step) in FIG. 8 can be omitted. A storage area for storing information about the display color before the display is updated (the current display color) also does not need to be reserved in a storage unit not shown.

Note, further, that a drive pulse table such as shown in FIG. 7 may be stored in a storage unit not shown, and the first pulse-applying means 210, the second pulse-applying means 220, the third pulse-applying means 230, and the fourth pulse-applying means 240 may reference the drive pulse table to determine the polarity of the drive pulse and the number of pulses. This aspect of the invention enables easily optimizing display control according to the characteristic of the electrophoretic display panel 10 by simply rewriting the drive pulse table.

Variation 1

Figure 10:
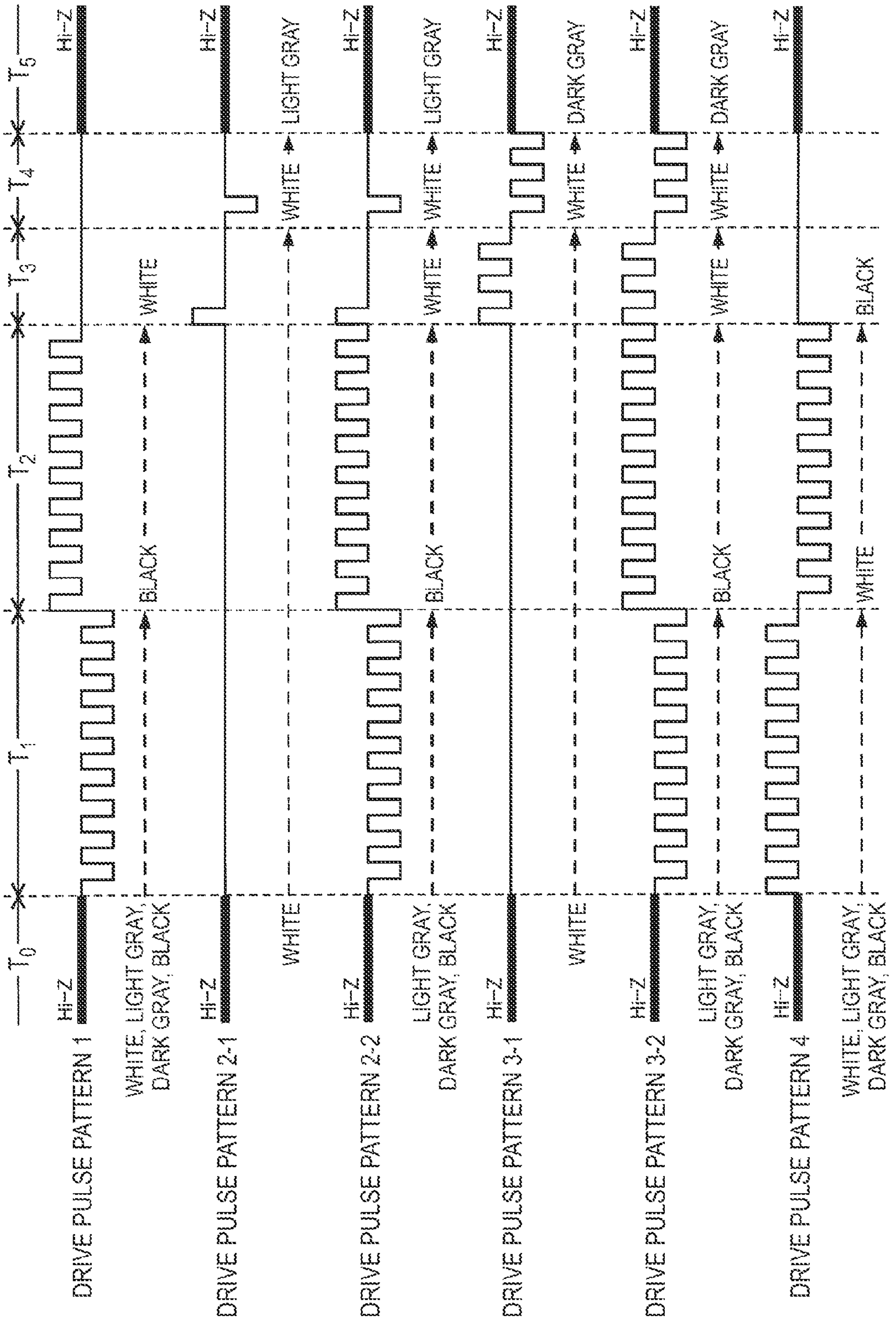
FIG. 10 shows an example of the drive pulse pattern according to a first variation of a preferred embodiment of the invention.

FIG. 10 shows the pattern of drive pulses applied to the segments 2 in a first variation of the embodiment. Periods $T_1$, $T_2$, $T_3$, and $T_4$ in FIG. 10 have the same meaning as in FIG. 9.

In FIG. 10, drive pulse pattern 1 shows the pattern of drive pulses applied to the segments 2 for which the updated display color is set to white (the display color before updating may be white, light gray, dark gray, or black), is the same as drive pulse pattern 1 in FIG. 9, and further description thereof is thus omitted.

Drive pulse pattern 2-1 is the pattern of drive pulses applied to the segments 2 of which the display color before updating is white and the updated display color is set to light gray.

With drive pulse pattern 2 in FIG. 9, nine −15 V pulses (first pulse) are applied in period $T_1$, setting the segment 2 to black, and nine +15 V pulses (second pulse) are applied in period $T_2$ to set the segment 2 to white. More specifically, a segment 2 that displayed white before updating is first changed to black and then reset to white through period $T_1$ and period $T_2$.

With drive pulse pattern 2-1, however, 0 V is applied to the segment 2 in period $T_1$ and period $T_2$, and segment 2 is held white through period $T_1$ and period $T_2$. One +15 V pulse (third pulse) is then applied to the segment 2 in period $T_3$, and one −15 V pulse (fourth pulse) is applied in period $T_4$ to set the segment 2 to light gray while maintaining DC balance.

Drive pulse pattern 2-2 shows the pattern of drive pulses applied to the segments 2 for which the display color before updating is light gray, dark gray, or black, and the updated display color is set to light gray. This drive pulse pattern is the same as drive pulse pattern 2 in FIG. 9, and further description thereof is thus omitted.

Drive pulse pattern 3-1 shows the pattern of drive pulses applied to the segments 2 of which the display color before updating is white and the updated display color is set to dark gray.

With drive pulse pattern 3-1, 0 V is applied in period $T_1$ and period $T_2$, three +15 V pulses (third pulse) are applied in period $T_3$, and three −15 V pulses (fourth pulse) are applied in period $T_4$ for the same reason described with reference to drive pulse pattern 2-1, thereby maintaining DC balance while setting the segment to dark gray.

Drive pulse pattern 3-2 shows the pattern of drive pulses applied to the segments 2 for which the display color before updating is light gray, dark gray, or black, and the updated display color is set to dark gray. This drive pulse pattern is the same as drive pulse pattern 3 in FIG. 9, and further description thereof is omitted.

Drive pulse pattern 4 shows the pattern of drive pulses applied to the segments 2 for which the updated display color is set to black (the display color before updating may be light gray, dark gray, black. This drive pulse pattern is the same as drive pulse pattern 4 in FIG. 9, and further description thereof is omitted.

Control is more complicated with this first variation than in the first embodiment described above because there are six drive pulse patterns, but current consumption can be reduced compared with the first embodiment because drive pulses are not applied in period $T_1$ and period $T_2$ to the segments 2 in which the display color before updating is white and the updated display color is set to light gray or dark gray.

Variation 2

With the drive pulse patterns shown in FIG. 9, nine first pulse (+15 V pulses or −15 V pulses) are always applied in the first pulse pulse applying step (period T1). This enables simplifying control, but does not apply the minimum number of pulses required according to the combination of colors that are displayed before and after the display is updated.

This variation 2 therefore changes the first pulse pulse applying step (period $T_1$) to apply the minimum number of first pulses that must be applied according to the combination of colors displayed before and after the display is updated.

Figure 11:
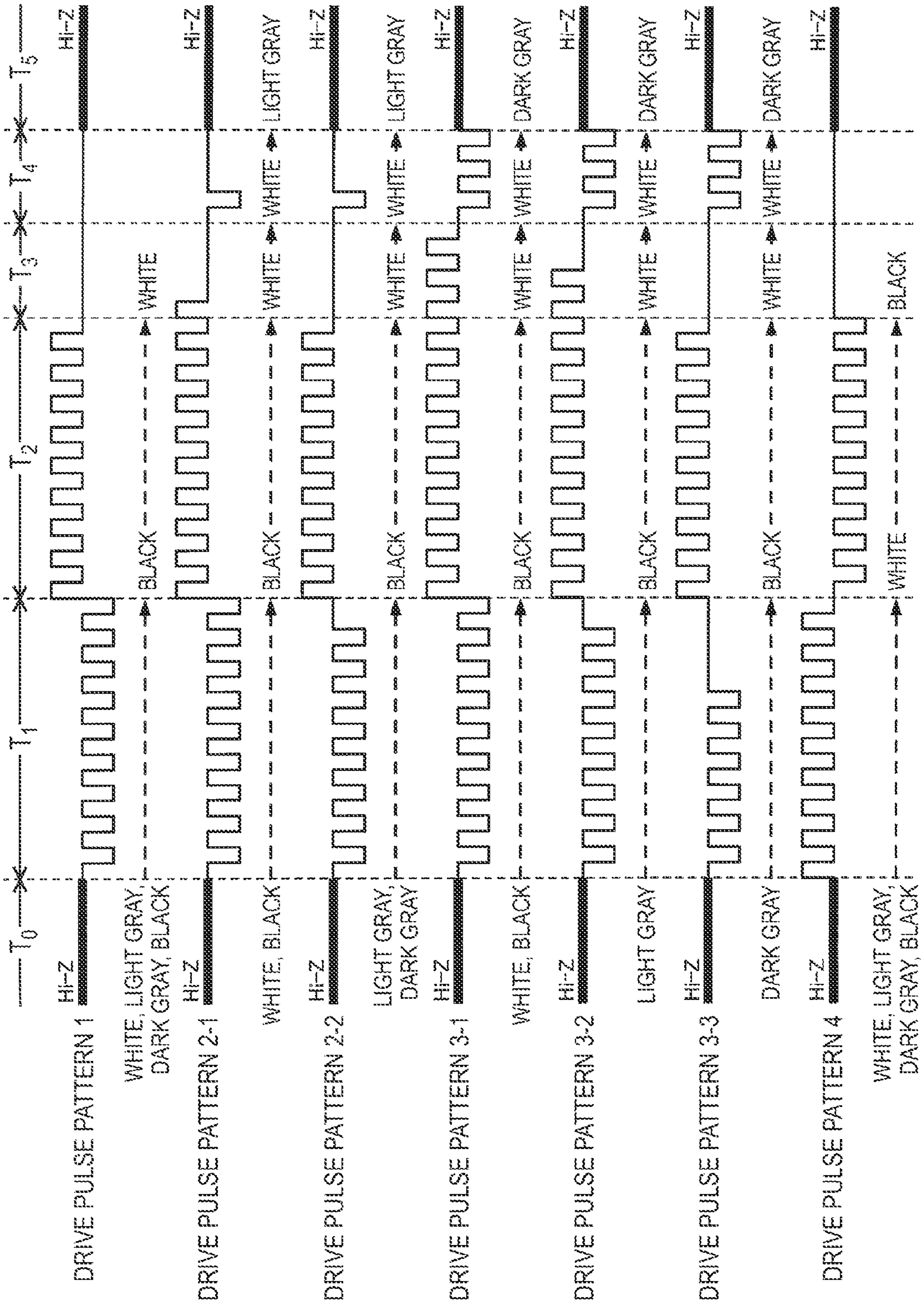
FIG. 11 shows an example of the drive pulse pattern according to a second variation of a preferred embodiment of the invention.

FIG. 11 shows the pattern of drive pulses applied to the segments 2 in this second variation of the embodiment. Periods $T_1$, $T_2$, $T_3$, and $T_4$ in FIG. 11 have the same meaning as in FIG. 9.

In FIG. 11, drive pulse pattern 1 shows the pattern of drive pulses applied to the segments 2 for which the updated display color is set to white (the display color before updating may be white, light gray, dark gray, or black). This is the same as drive pulse pattern 1 in FIG. 9, and further description thereof is omitted.

Drive pulse pattern 2-1 shows the pattern of drive pulses applied to the segments 2 of which the display color before updating is white or black and the updated display color is set to light gray. This is pattern is the same as drive pulse pattern 2 in FIG. 9, and further description thereof is omitted.

Drive pulse pattern 2-2 shows the pattern of drive pulses applied to the segments 2 of which the display color before updating is light gray or dark gray and the updated display color is set to light gray.

As shown in the drive pulse table in FIG. 7, because a segment 2 displaying light gray changes to black when eight −15 V pulses are applied thereto, eight −15 V pulses (first pulse) are applied in period $T_1$ according to drive pulse pattern 2-2. More specifically, the number of −15 V pulses (first pulse) applied in period $T_1$ is one less than is applied by drive pulse pattern 2 in FIG. 9. As a result, while one +15 V pulse (third pulse) must be applied in period $T_3$ to maintain DC balance with the drive pulse pattern 2 shown in FIG. 9, a +15 V pulse (third pulse) need not be applied with drive pulse pattern 2-2.

It should be noted that a segment 2 displaying dark gray changes to black when six −15 V pulses are applied as shown in the drive pulse table in FIG. 7, but eight −15 V pulses (first pulse) are applied in period $T_1$ with drive pulse pattern 2-2. This is because at least nine +15 V pulses (second pulse) must be applied in period $T_2$ to change the segment 2 from black to white, or only one −15 V pulse (fourth pulse) must be applied in period $T_4$ to change the segment 2 from white to light gray, and DC balance cannot be maintained unless at least eight −15 V pulses (first pulse) are applied to the segment 2 in period $T_1$.

Drive pulse pattern 3-1 shows the pattern of drive pulses applied to the segments 2 of which the display color before updating is white or black and the updated display color is set to dark gray. This pattern is the same as drive pulse pattern 3 in FIG. 9, and further description thereof is omitted.

Drive pulse pattern 3-2 shows the pattern of drive pulses applied to the segments 2 of which the display color before updating is light gray and the updated display color is set to dark gray.

As with drive pulse pattern 2-2, with drive pulse pattern 3-2, eight −15 V pulses (first pulse) are applied in period $T_1$. More specifically, one less −15 V pulse (first pulse) is applied in period $T_1$ than with drive pulse pattern 3 in FIG. 9. As a result, while three +15 V pulses (third pulse) must be applied in period $T_3$ to maintain DC balance with the drive pulse pattern 3 shown in FIG. 9, only two +15 V pulses (third pulse) need to be applied with drive pulse pattern 3-2.

Drive pulse pattern 3-3 shows the pattern of drive pulses applied to the segments 2 of which the display color before updating is dark gray and the updated display color is set to dark gray.

As will be known from the drive pulse table shown in FIG. 7, because a segment 2 displaying dark gray changes to black when six −15 V pulses are applied, only six −15 V pulses (first pulse) are applied in period $T_1$ with drive pulse pattern 3-3. More specifically, three fewer −15 V pulses (first pulse) are applied in period $T_1$ than are applied with drive pulse pattern 3 in FIG. 9. As a result, while three +15 V pulses (third pulse) must be applied in period $T_3$ to maintain DC balance with drive pulse pattern 3 in FIG. 9, +15 V pulses (third pulse) do not need to be applied with drive pulse pattern 3-3.

Drive pulse pattern 4 shows the pattern of drive pulses applied to the segments 2 of which the updated display color is set to black (the display color before updating may be white, light gray, dark gray, or black). This pattern is the same as drive pulse pattern 4 in FIG. 9, and further description thereof is omitted.

With this second variation of the preferred embodiment control is more complicated than in the first embodiment because there are seven different drive pulse patterns, but current consumption can be reduced compared with the first embodiment because the number of drive pulses applied in period $T_1$ and period $T_3$ to the segments 2 of which the display color before updating and the updated display color are both light gray or dark gray can be reduced.

Variation 3

Segments 2 of which the display color before and after updating is light gray or dark gray may be changed to either white or black in the first pulse applying step (period $T_1$). This third variation therefore changes such segments 2 in period $T_1$ to the color, either black or white, that can be achieved by applying the least number of drive pulses.

As will be known from the drive pulse table in FIG. 7, a segment 2 displaying light gray will change to black if eight −15 V pulses are applied, and will change to white if seven +15 V pulses are applied.

In addition, if six −15 V pulses are applied to a segment 2 displaying dark gray, the segment 2 will change to black, and if eight +15 V pulses are applied, the segment 2 will change to white.

In period $T_1$ in this third variation, therefore, segments 2 of which the display color before updating is light gray and the updated display color is set to light gray or dark gray are changed to white, and segments 2 of which the display color before updating is dark gray and the updated display color is set to light gray or dark gray are changed to black.

Figure 12:
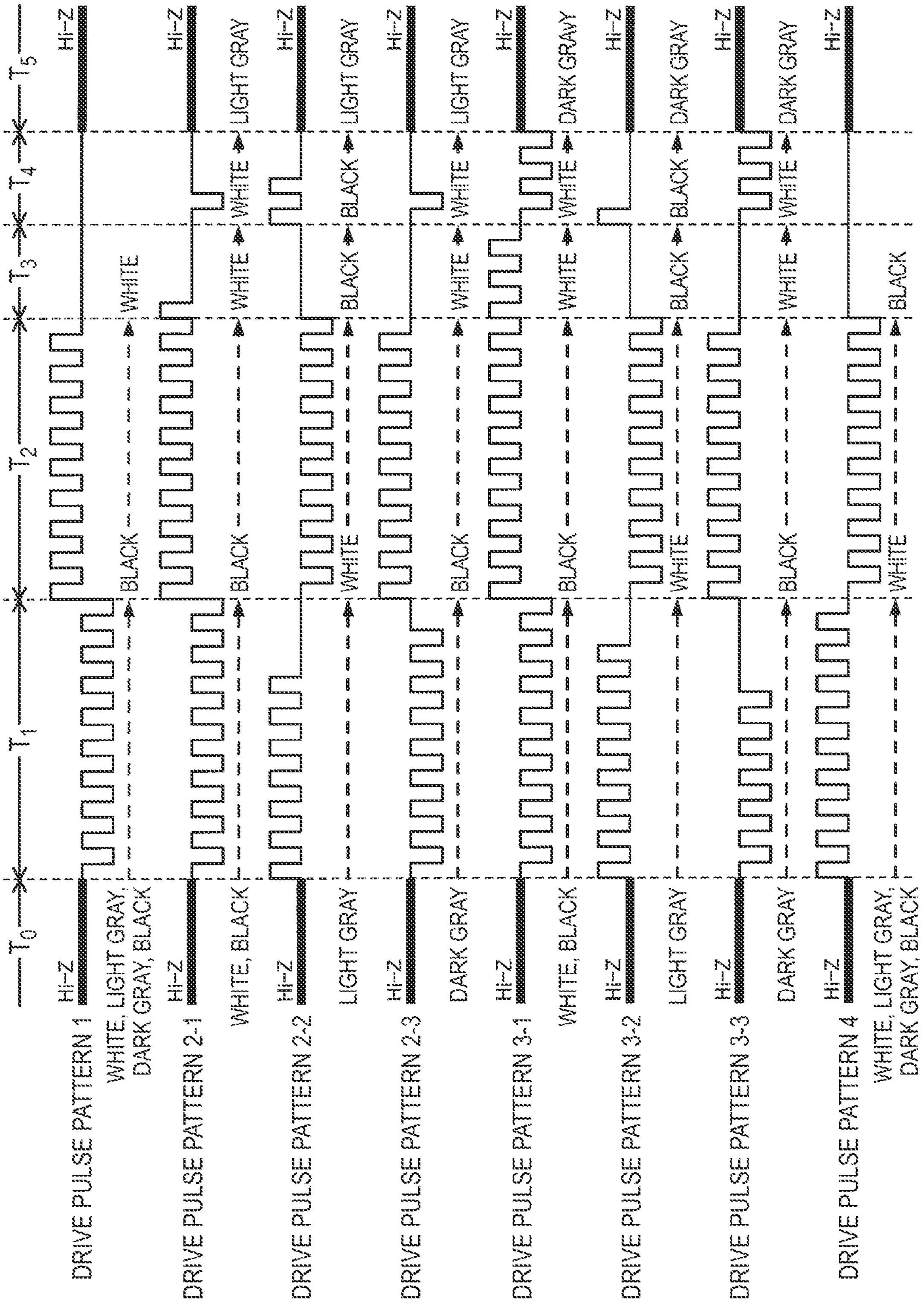
FIG. 12 shows an example of the drive pulse pattern according to a third variation of a preferred embodiment of the invention.

FIG. 12 shows the patterns of drive pulses applied to the segments 2 in this third variation. Periods $T_1$, $T_2$, $T_3$, and $T_4$ in FIG. 12 have the same meaning as in FIG. 9.

Drive pulse pattern 1, drive pulse pattern 2-1, drive pulse pattern 3-1, and drive pulse pattern 4 in FIG. 12 are the same as drive pulse pattern 1, drive pulse pattern 2-1, drive pulse pattern 3-1, and drive pulse pattern 4 in FIG. 11, and further description thereof is thus omitted.

Drive pulse pattern 2-2 shows the pattern of drive pulses applied to the segments 2 of which the display color before updating is light gray and the updated display color is set to light gray.

With drive pulse pattern 2-2, seven +15 V pulses (first pulse) are applied in period $T_1$ to these segments 2, which thus turn white. In period $T_2$, nine −15 V pulses (second pulse) are applied, causing those segments 2 to turn black. In period $T_3$ 0 V is applied and the segments 2 continue displaying black. In period $T_4$, two +15 V pulses (fourth pulse) are applied, changing the segments 2 to light gray.

Drive pulse pattern 2-3 shows the pattern of drive pulses applied to the segments 2 of which the display color before updating is dark gray and the updated display color is set to light gray. This pattern is the same as drive pulse pattern 2-2 in FIG. 11, and further description thereof is omitted.

Drive pulse pattern 3-2 shows the pattern of drive pulses applied to the segments 2 of which the display color before updating is light gray and the updated display color is set to dark gray.

With drive pulse pattern 3-2, eight +15 V pulses (first pulse) are applied to these segments 2 in period $T_1$, and the segments 2 turn white. In period $T_2$, nine −15 V pulses (second pulse) are applied, and the segments 2 turn black. In period $T_3$, 0 V is applied and the segments continue displaying black. In period $T_4$, one +15 V pulse (fourth pulse) is applied, and the segments 2 turn dark gray.

Note that as will be known from the drive pulse table in FIG. 7, a segment 2 displaying light gray changes to white if seven +15 V pulses are applied, but eight +15 V pulses (first pulse) are applied in period $T_1$ with drive pulse pattern 2-2. This is because at least nine −15 V pulses (second pulse) must be applied in period $T_2$ to change these segments 2 from white to black, and only one +15 V pulse (fourth pulse) must be applied in period $T_4$ to change these segments 2 from black to dark gray, and a DC balance cannot be maintained if at least eight +15 V pulses (first pulse) are not applied to these segments 2 in period $T_1$.

Drive pulse pattern 3-3 shows the pattern of drive pulses applied to the segments 2 of which the display color before updating is dark gray and the updated display color is set to dark gray. This pattern is the same as drive pulse pattern 3-3 in FIG. 11, and further description thereof is omitted.

With this third variation of the preferred embodiment control is more complicated than in the first embodiment because there are eight different drive pulse patterns, but current consumption can be reduced compared with the first embodiment because the number of drive pulses applied in period $T_1$ and period $T_3$ to the segments 2 of which the display color before updating and the updated display color are both light gray or dark gray can be reduced.

Variation 4

That the white particles 17 and black particles 18 migrate slightly back in the period after a drive pulse is applied and before the next drive pulse is applied is known from the literature. As a result, the white particles 17 and black particles 18 can be made to move more quickly by applying a single wide drive pulse equal to the combined pulse width of a plurality of narrow drive pulses than by the plural drive pulses with a narrow pulse width. On the other hand, when the display color of the segment 2 is changed to light gray or dark gray, pulses with a narrow pulse width must be applied to precisely adjust the display color, but fine adjustment is not required when the display color of a segment 2 is white or black.

Therefore, when a segment 2 is changed to white or black, this fourth variation of the preferred embodiment applies drive pulses with a wider pulse width and thereby shortens the time required to update the display.

FIG. 13 shows an example of a drive pulse table defining the drive pulse polarity and the number of pulses required to change the display color of the segments 2 in this fourth variation of the invention.

As shown in FIG. 13, an electrophoretic display panel 10 used in this fourth variation changes a segment 2 displaying white to light gray by applying one −15 V pulse with a 200 ms pulse width (note that a pulse with a 200 ms pulse width is referred to below as a B pulse), to dark gray by applying three −15 V B pulses, and to black by applying nine −15 V B pulses. A segment 2 displaying white changes to black when three −15 V pulses with a 250 ms pulse width (note that a pulse with a 250 ms pulse width is referred to below as an A pulse) are applied thereto.

A segment 2 displaying light gray changes to white when seven +15 V B pulses are applied, changes to dark gray when two −15 V B pulses are applied, and changes to black when eight −15 V B pulses are applied.

A segment 2 displaying dark gray changes to white when eight +15 V B pulses are applied, changes to light gray when one +15 V B pulse is applied, and changes to black when six −15 V B pulses are applied.

A segment 2 displaying black changes to white when nine +15 V B pulses are applied, changes to light gray when two +15 V B pulses are applied, and changes to dark gray when one +15 V B pulse is applied.

A segment 2 displaying black changes to white when three −15 V A pulses are applied.

Figure 14:
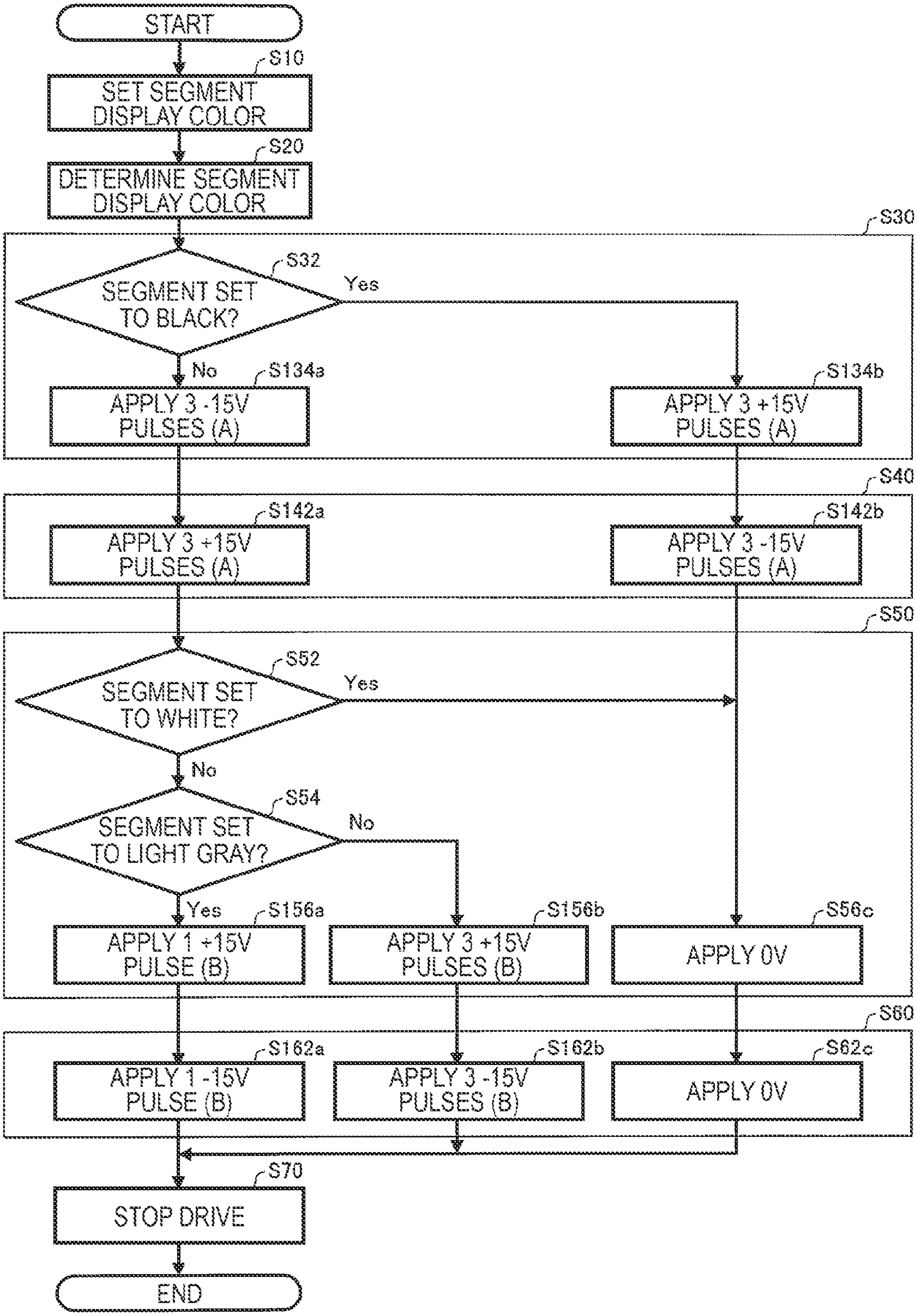
FIG. 14 is a flow chart of the drive process for an electrophoretic display panel according to the fourth variation of a preferred embodiment of the present invention.

FIG. 14 is a flow chart describing a method of driving the electrophoretic display panel 10 according to this fourth variation. Note that identical steps are identified with the same reference numerals in the flow charts in FIG. 14 and FIG. 8.

As shown in the flow chart in FIG. 14, three −15 V A pulses (first pulse) are applied in step S134*a*, and then three +15 V A pulses (second pulse) are applied in step S142*a*, to the segments 2 of which the updated display color is set to white, light gray, or dark gray (step S32 returns No).

If the updated display color of the segment 2 is set to black (step S32 returns Yes), three +15 V A pulses (first pulse) are applied in step S134*b*, and three −15 V A pulses (second pulse) are applied in step S142*b*.

As will be known from the drive pulse table in FIG. 13, applying three −15 V A pulses changes any segment 2 to black, whether it is displaying white, light gray, dark gray, or black, and applying three +15 V A pulses changes the segment 2 to white. More specifically, any segment 2 of which the updated display color is set to white, light gray, or dark gray changes to black and then to white as a result of steps S134*a* and S142*a*, and any segment 2 of which the updated display color is set to black changes to white and is then set to black as a result of steps S134*b* and S142*b*.

Subsequent operation in steps S156*a*, S156*b*, S162*a*, and S162*b* is the same as shown in the flow chart in FIG. 8 except for applying B pulses, and further description thereof is thus omitted.

Figure 15:
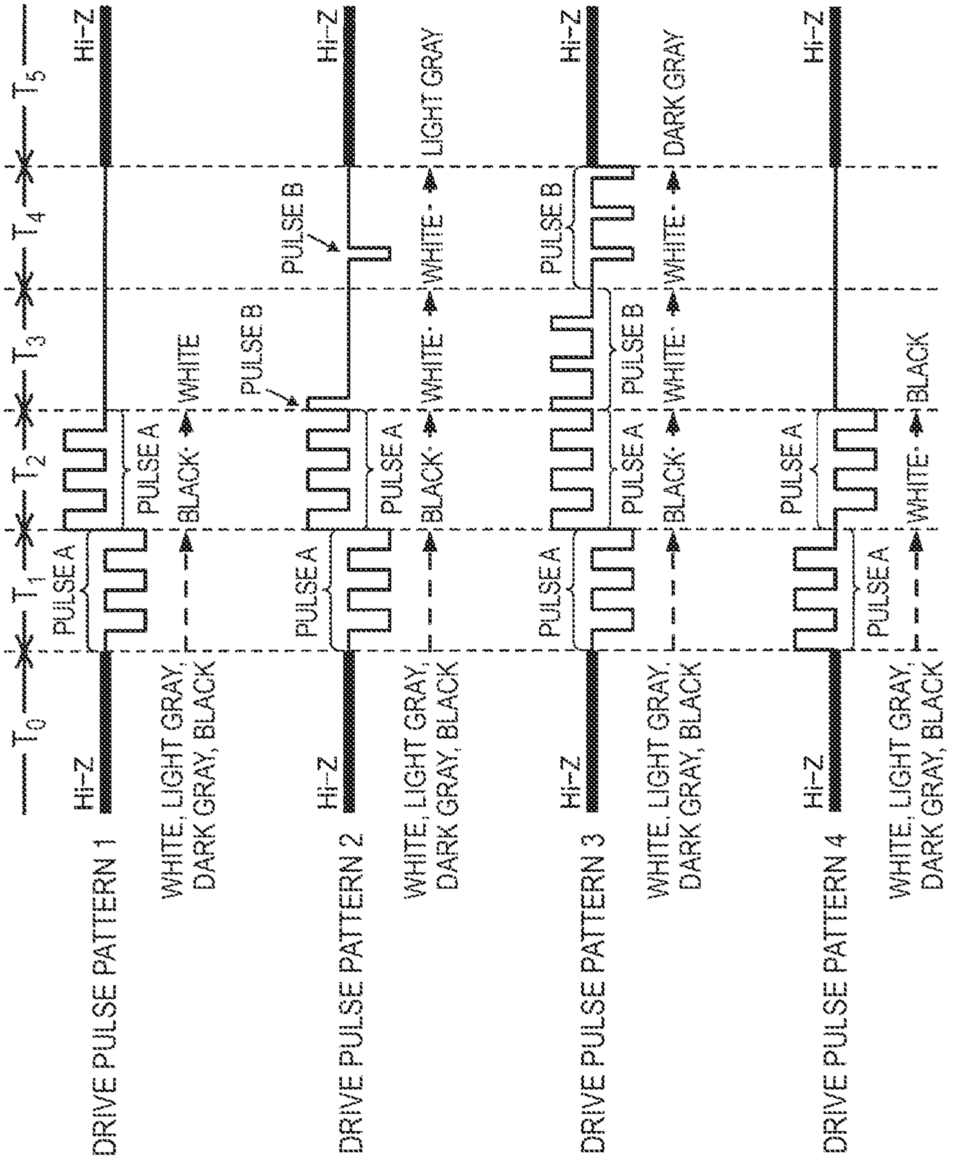
FIG. 15 shows an example of the drive pulse pattern according to the fourth variation of a preferred embodiment of the invention.

FIG. 15 shows the patterns of drive pulses applied to the segments 2 according to the flow chart in FIG. 14. Periods $T_1$, $T_2$, $T_3$, and $T_4$ in FIG. 15 have the same meaning as in FIG. 9.

In FIG. 15, drive pulse patterns 1 to 4 show the patterns of the drive pulses respectively applied to the segments 2 of which the updated display color is set to white, light gray, dark gray, or black (the display color before updating may be white, light gray, dark gray, or black).

With drive pulse patterns 1, 2, and 3, three −15 V A pulses (first pulse) are applied in period $T_1$, and three +15 V A pulses (second pulse) are applied in period $T_2$.

With drive pulse pattern 1, 0 V is also applied in period $T_3$ and period $T_4$, and DC balance is thus assured.

With drive pulse pattern 2, one +15 V B pulse (third pulse) is also applied in period $T_3$, and one −15 V B pulses (fourth pulse) is applied in period $T_4$, and DC balance is thus assured.

With drive pulse pattern 3, three +15 V B pulses (third pulse) are also applied in period $T_3$, and three −15 V B pulses (fourth pulse) are applied in period $T_4$, and DC balance is thus assured.

In addition, with drive pulse pattern 4, three +15 V A pulses (first pulse) are applied in period $T_1$, and three −15 V A pulses (second pulse) are applied in period $T_2$, and DC balance is thereby assured.

This fourth variation thus applies in period $T_1$ and period $T_2$ drive pulses (A pulses) that have a greater pulse width than the drive pulses (B pulses) that are applied in period $T_1$ and period $T_4$. Therefore, compared with a configuration in which pulses of a constant width are always applied, this fourth variation can shorten the duration of period $T_1$ and period $T_2$. More specifically, this fourth variation can update the display in all of segments 2 in less time while assuring a DC balance.

Variation 5

Figure 16:
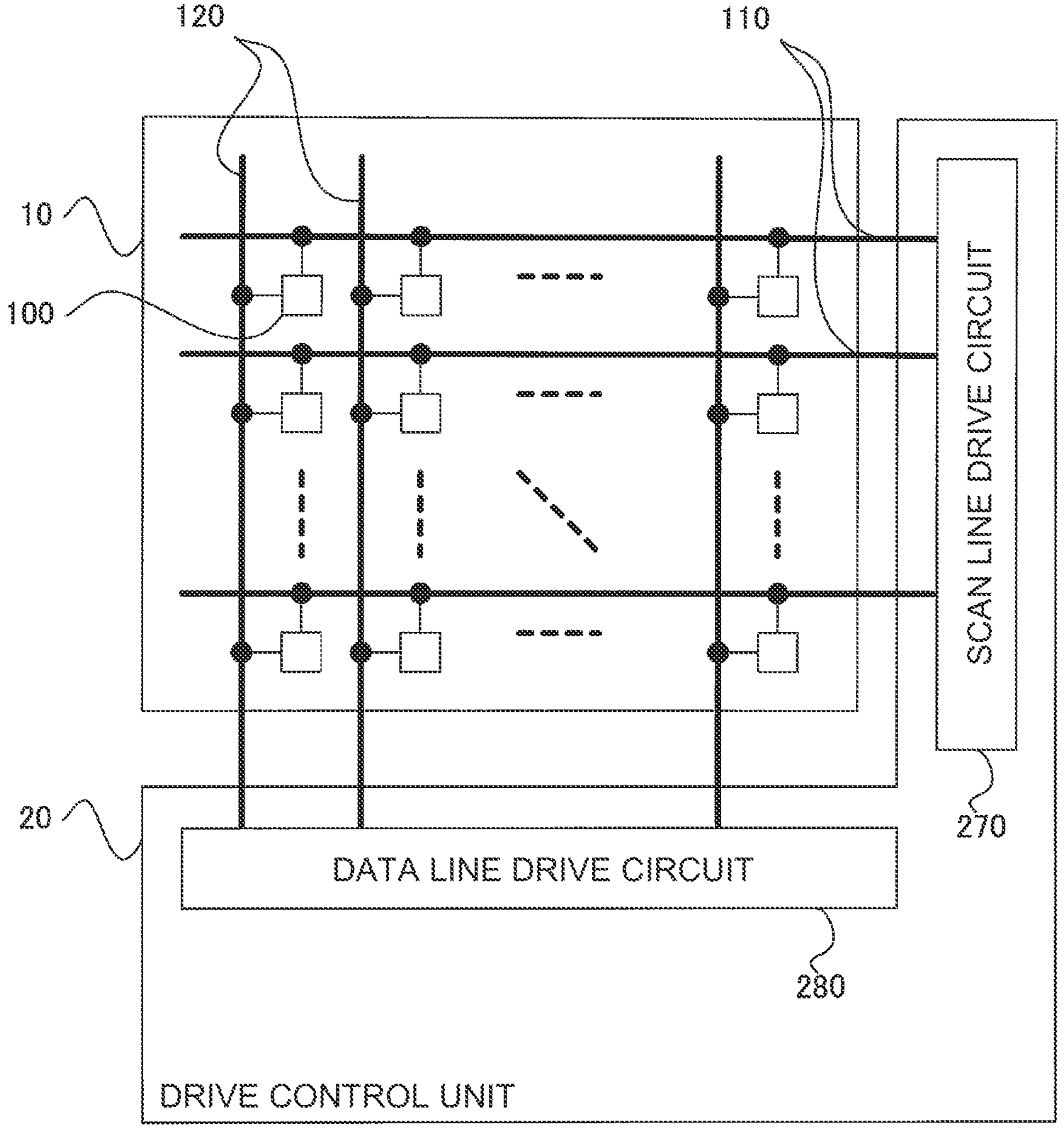
FIG. 16 describes an electrophoretic display device according to a fifth variation of the invention.

The foregoing embodiments of the invention are described using an electrophoretic display panel 10 that has individual display segments, but the electrophoretic display panel 10 may alternatively be an active matrix display panel. FIG. 16 schematically describes an electrophoretic display device according to this fifth variation of the invention.

The electrophoretic display panel 10 shown in FIG. 16 is an active matrix electrophoretic display panel. The electrophoretic display panel 10 is rendered with a TFT (thin film transistor) circuit having a pixel electrode (equivalent to the "drive electrode" in the invention) and a TFT device 100 for each pixel.

The drive control unit 20 may be rendered with a scan line drive circuit 270 that outputs a scanning signal to the scan lines 110 of the TFT circuit, and a data line drive circuit 280 that outputs a data signal to the data lines 120 of the TFT circuit, in addition to the display color setting means 200, first pulse-applying means 210, second pulse-applying means 220, third pulse-applying means 230, fourth pulse-applying means 240, and display color evaluation means 250 shown in FIG. 4.

The first pulse-applying means 210, second pulse-applying means 220, and fourth pulse-applying means 240 of the drive control unit 20 may apply drive pulses to the pixel electrodes through the scan line drive circuit 270 and data line drive circuit 280.

The operation of this active matrix electrophoretic display panel is identical to the operation of the segment electrophoretic display panel 10 described in FIG. 2 and FIG. 3 except that the pixel electrodes are substituted for the segment electrodes.

In addition, an electrophoretic display device that uses an active matrix electrophoretic display panel has the same effects as the electrophoretic display device 1 that uses a segment electrophoretic display panel 10 as described above.

2. Electronic Devices

Figure 17A:
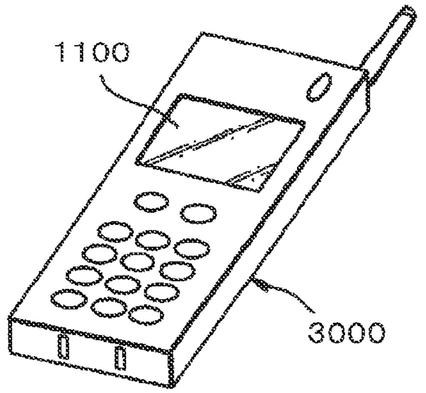
FIG. 17A to FIG. 17C show examples of electronic devices according to preferred embodiments of the present invention.
Figure 17B:
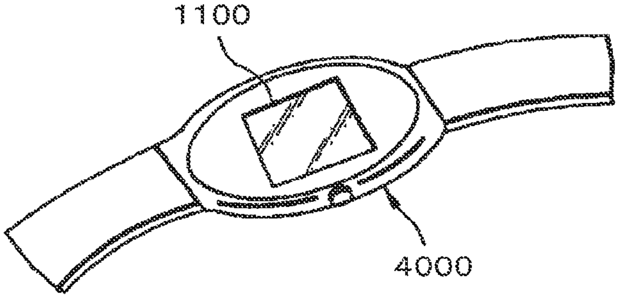
Figure 17C:
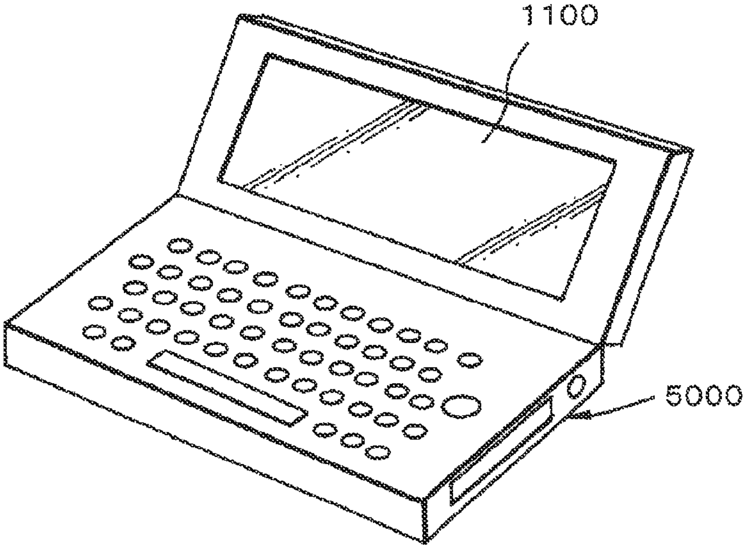

FIG. 17A to FIG. 17C show examples of electronic devices according to preferred embodiments of the invention. FIG. 17A shows a cell phone 3000, FIG. 17B shows a wristwatch 4000, and FIG. 17C shows a laptop computer 5000.

The cell phone 3000, wristwatch 4000, and laptop computer 5000 according to this embodiment of the invention each have an electrophoretic display device 1, and uses the electrophoretic display panel 10 of the electrophoretic display device 1 as a display unit 1100.

As a result, an electronic device that can maintain high reliability and has little display degradation even with extended long-term use can be achieved.

It will be obvious to one with ordinary skill in the related art that the invention is not limited to the embodiments described above, and can be varied in many ways without departing from the scope of the accompanying claims.

For example, in the flow charts shown in FIG. 8 and FIG. 14, −15 V pulses are applied in the first pulse applying step (S30) to segments 2 of which the current display color is light gray or dark gray to make those segments 2 black, but +15 V pulses may be applied instead to change those segments 2 to white.

In addition, the embodiments are described as producing drive pulses using a so-called variable common electrode drive method whereby the potential of the segment electrodes (drive electrodes) is held constant and pulses are applied to the common electrode, but the drive pulses may be generated by holding the potential of the common electrode constant and applying pulses to the segment electrodes (drive electrodes).

The invention has also been described using as an example an electrophoretic display device that can display the four colors white, light gray, dark gray, and black, but the invention can also be adapted in part for use with electrophoretic display devices that display two colors, black and white (or another two colors). In a two-color electrophoretic display device, the third pulse-applying means 230 (third pulse applying step (S50)) and the fourth pulse-applying means 240 (fourth pulse applying step (S60)) may be omitted.

The invention includes configurations (such as configurations having the same function, method, and result, and configurations with the same purpose and effect) that are functionally equal to the configurations of the embodiments described above. The invention also includes configurations that replace non-essential parts of the configurations of the embodiments described above. The invention also includes configurations that have the same operational effect, and configurations that achieve the same object, as the configurations of the embodiments described above. The invention also includes configurations that add technology known from the literature to the configurations described in the foregoing embodiments.

What is claimed is:

1. An electrophoretic display device comprising:

an electrophoretic display panel that has a plurality of drive electrodes, a common electrode, a plurality of electrophoretic particles disposed between the drive electrodes and the common electrode, and a display having a plurality of display units, each associated with a particular one of the drive electrodes;

a drive control unit that applies voltage between the drive electrodes and the common electrode to update the display of the electrophoretic display panel;

the electrophoretic display device being capable of displaying a plurality of colors including a first color and a second color in each of the display units;

the drive control unit including a display color setting means that sets for each display unit an updated display color indicating the color to be displayed after the display unit is updated, a first pulse-applying means that applies a first pulse between the common electrode and the drive electrode of at least one display unit, and a second pulse-applying means that applies a second pulse between the common electrode and the drive electrode of at least one display unit, wherein the first pulse-applying means applies the first pulse to display in the at least one display units the first color or second color that is different from the color to be displayed after the display color setting means sets the updated display color for that display unit, and the second pulse-applying means applies a second pulse that is opposite in polarity to the first pulse in the same amount as the first pulse to set the color of the at least one display unit to the updated display color; and a third pulse-applying means that applies a third pulse between the common electrode and the drive electrode of the at, least one display unit;

wherein to the at least one display unit for which the updated display color is set to any intermediate color between the first color and the second color, the third pulse applied by the third pulse-applying means is the same polarity as the second pulse.

2. The electrophoretic display device described in claim 1, wherein:

the first pulse-applying means applies a second pulse of the same polarity to the display units set to the same display color by the display color setting means.

3. The electrophoretic display device described in claim 1, wherein:

the first pulse-applying means applies the same amount of first pulses to all display units that are to display the first color, and applies the same amount of first pulses to all display units that are to display the second color.

4. The electrophoretic display device described in claim 1, further comprising:

a fourth pulse-applying means that applies a fourth pulse between the common electrode and the drive electrode of at least one display unit;

wherein to the at least one display unite for which the updated display color is set to any intermediate color between the first color and the second color, the first pulse-applying means applies the first pulse to display in the at least one display unit either the first color or the second color, the second pulse-applying means applies a second pulse of opposite polarity to the first pulse to change the at least one display unite to the first color or the second color, and the fourth pulse-applying means applies a fourth pulse of opposite polarity to the third pulse to update the at least one display unit to the updated display color; and the sum of the applied second pulses and the applied third pulses, and the sum of the applied first pulses and the applied fourth pulses, are substantially equal.

5. The electrophoretic display device described in claim 4, wherein:

the first pulse-applying means applies a first pulse of the same polarity to all display units of which the updated display color is set to an intermediate color.

6. The electrophoretic display device described in claim 4, wherein:

the first pulse-applying means applies a first pulse that is wider than the fourth pulse.

7. An electronic device comprising an electrophoretic display device described in claim 1.

8. A drive method for an electrophoretic display panel that has a plurality of drive electrodes, a common electrode, and a plurality of electrophoretic particles disposed between the drive electrodes and the common electrode, and a display having a plurality of display units, each associated with a articular one of the drive electrodes;

the drive method comprising:

a display color setting step of setting an updated display color, which indicates the color to be displayed after the display unit is updated, to one of a plurality of colors including a first color and a second color for each display unit;

a first pulse-applying step of applying a first pulse between the common electrode and the drive electrode of at least one display unit; and a second pulse-applying step of applying a second pulse between the common electrode and the drive electrode of the at least one display unit; wherein the first pulse-applying step applies the first pulse to display in the at least one display unit the first color or second color that is different from the color to be displayed after the setting of the updated display color for that display unit, and the second pulse-applying step applies a second pulse that is opposite in polarity to the first pulse in the same amount as the first pulse to set the color of the at least one display unit to the updated display color; and, a third pulse-applying step of applying a third pulse between the common electrode and the drive electrode of the at least, one display unit;

wherein to the at least one display unit for which the updated display color is set to any intermediate color between the first color and the second color, the third pulse applied is the same polarity as the second pulse.

* * * * *